United States Patent
Ma et al.

(10) Patent No.: US 12,262,041 B2
(45) Date of Patent: Mar. 25, 2025

(54) PICTURE PREDICTION METHOD, ENCODER, DECODER AND COMPUTER STORAGE MEDIUM

(71) Applicant: GUANGDONG OPPO MOBILE TELECOMMUNICATIONS CORP., LTD., Dongguan (CN)

(72) Inventors: Yanzhuo Ma, Dongguan (CN); Ruipeng Qiu, Dongguan (CN); Junyan Huo, Dongguan (CN); Shuai Wan, Dongguan (CN); Fuzheng Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 66 days.

(21) Appl. No.: 18/126,696

(22) Filed: Mar. 27, 2023

(65) Prior Publication Data
US 2023/0262251 A1    Aug. 17, 2023

Related U.S. Application Data

(63) Continuation of application No. PCT/CN2020/119731, filed on Sep. 30, 2020.

(51) Int. Cl.
*H04N 19/50* (2014.01)
*H04N 19/176* (2014.01)
*H04N 19/186* (2014.01)

(52) U.S. Cl.
CPC ........... *H04N 19/50* (2014.11); *H04N 19/176* (2014.11); *H04N 19/186* (2014.11)

(58) Field of Classification Search
CPC .... H04N 19/11; H04N 19/117; H04N 19/147; H04N 19/176; H04N 19/186; H04N 19/50; H04N 19/51; H04N 19/593
(Continued)

(56) References Cited

U.S. PATENT DOCUMENTS

| 10,939,117 | B2 | 3/2021 | Laroche |
| 2016/0295220 | A1* | 10/2016 | Oh ...................... H04N 21/4312 |

(Continued)

FOREIGN PATENT DOCUMENTS

| CN | 106303535 A | 1/2017 |
| CN | 110557646 A | 12/2019 |

(Continued)

OTHER PUBLICATIONS

International Search Report in the international application No. PCT/CN2020/119731, mailed on Jun. 24, 2021.
(Continued)

*Primary Examiner* — Behrooz M Senfi
(74) *Attorney, Agent, or Firm* — BAYES PLLC

(57) ABSTRACT

An image prediction method includes: an initial prediction value of a to-be-predicted colour component of a current block is determined; a sample associated with a reference colour component of the current block is determined; side information of the current block is determined according to the sample associated with the reference colour component; the initial prediction value is filtered by using a preset network model and the side information of the current block, to obtain a target prediction value of the to-be-predicted colour component of the current block; and the to-be-predicted colour component of the current block is encoded according to the target prediction value.

20 Claims, 23 Drawing Sheets

(58) Field of Classification Search
USPC .................................................. 375/240.12
See application file for complete search history.

(56) References Cited

U.S. PATENT DOCUMENTS

| | | | |
|---|---|---|---|
| 2020/0244997 A1 | 7/2020 | Galpin et al. | |
| 2020/0288135 A1 | 9/2020 | Laroche et al. | |
| 2021/0092396 A1* | 3/2021 | Zhang | H04N 19/117 |
| 2022/0014772 A1* | 1/2022 | Wan | H04N 19/50 |

FOREIGN PATENT DOCUMENTS

| | | | | |
|---|---|---|---|---|
| CN | 110602491 A | | 12/2019 | |
| CN | 110677644 A | | 1/2020 | |
| CN | 110896478 A | | 3/2020 | |
| CN | 111164651 A | | 5/2020 | |
| CN | 111373751 B | * | 2/2023 | ............. G06N 3/045 |

OTHER PUBLICATIONS

Written Opinion of the International Searching Authority in the international application No. PCT/CN2020/119731, mailed on Jun. 24, 2021.

Meyer Maria et al: "Convolutional Neural Networks for Video Intra Prediction Using Cross-component Adaptation", ICASSP 2019-2019 IEEE International Conference on Acoustics, Speech and Signal Processing (ICASSP), IEEE, May 12, 2019 (May 12, 2019), pp. 1607-1611, XP033565378, DOI: 10.1109/ICASSP.2019.8682846, abstract. 5 pages.

Blanch Marc Gorriz et al: "Chroma Intra Prediction With Attention-Based CNN Architectures", 2020 IEEE International Conference on Image Processing (ICIP), IEEE, Oct. 25, 2020 (Oct. 25, 2020), pp. 783-787, XP033869761, DOI: 10.1109/ICIP40778.2020.9191050, abstract. 5 pages.

Supplementary European Search Report in the European application No. 20955825.3, mailed on Nov. 3, 2023. 15 pages.

* cited by examiner

PICTURE PREDICTION METHOD, ENCODER, DECODER AND COMPUTER STORAGE MEDIUM

CROSS-REFERENCE TO RELATED APPLICATION

This application is a continuation of International Application No. PCT/CN2020/119731 filed on Sep. 30, 2020, the disclosure of which is hereby incorporated by reference in its entirety.

BACKGROUND

With the improvement of people's requirements for quality of video display, new video applications such as high-definition and ultra-high-definition video came into being. H.266/High Efficiency Video Coding (HEVC) has been unable to meet the requirements for the rapid development of video applications. The Joint Video Exploration Team (JVET) has established the latest video coding standard, i.e., H.266/Versatile Video Coding (VVC), a corresponding test model of which is VVC Test Model (VTM).

In H.266/VVC, correlations of video data in space and time and between components are considered, and many prediction technologies have been produced at present. Among the existing prediction technologies, existing prediction algorithms do not fully consider the correlation between different components, which results in a reduction in accuracy of inter-component prediction, thus reducing the compression and coding efficiency. In addition, there is obvious discontinuity between a prediction value of a current block determined by the existing Cross-component Linear Model (CCLM) prediction mode and values of reference samples adjacent to the current block, which reduces the prediction accuracy and reduces the compression and coding efficiency.

SUMMARY

The disclosure relates to the field of video encoding and decoding, in particular to a picture prediction method, an encoder, a decoder and a computer storage medium.

The disclosure provides a picture prediction method, an encoder, a decoder and a computer storage medium, which can realize the enhancement of the prediction value of a colour component, so that the enhanced target prediction value is closer to the true value, thereby effectively improving the prediction accuracy and improving the encoding and decoding efficiency.

The technical scheme of the present disclosure can be implemented as follows.

In a first aspect, embodiments of the present disclosure provide a picture prediction method, applied to an encoder, the method includes following operations.

An initial prediction value of a to-be-predicted colour component of a current block is determined.

A sample associated with a reference colour component of the current block is determined.

Side information of the current block is determined according to the sample associated with the reference colour component.

The initial prediction value is filtered by using a preset network model and the side information of the current block, to obtain a target prediction value of the to-be-predicted colour component of the current block.

The to-be-predicted colour component of the current block is encoded according to the target prediction value.

In a second aspect, embodiments of the present disclosure provide a picture prediction method, applied to a decoder, the method includes following operations.

A bitstream is parsed to acquire a target prediction mode of a current block.

An initial prediction value of a to-be-predicted colour component of a current block is determined according to the target prediction mode.

A sample associated with a reference colour component of the current block is determined.

Side information of the current block is determined according to the sample associated with the reference colour component.

The initial prediction value is filtered by using a preset network model and the side information of the current block, to obtain a target prediction value of the to-be-predicted colour component of the current block.

The to-be-predicted colour component of the current block is decoded according to the target prediction value.

DETAILED DESCRIPTION

Figure 1:
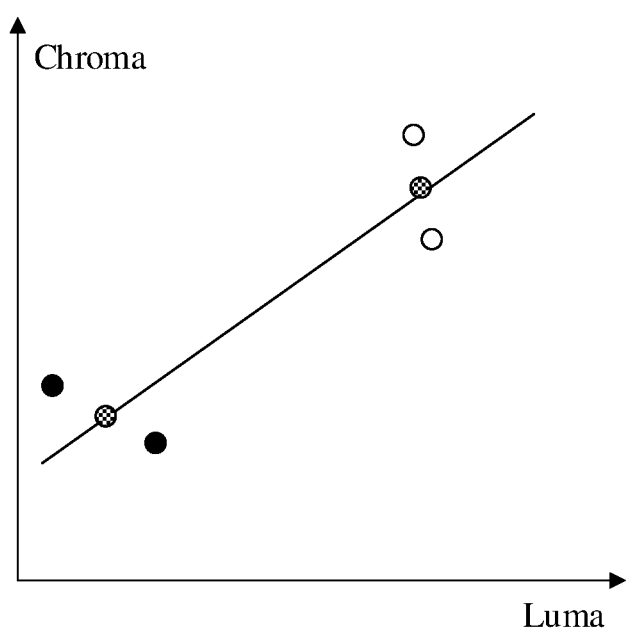
FIG. 1 is a flowchart of a Matrix weighted Intra Prediction (MIP) process according to a related technical scheme.

In order to have a more detailed understanding of the features and technical contents of the embodiments of the present disclosure, the implementation of the embodiments of the present disclosure will be described in detail below in conjunction with the accompanying drawings, which are for reference only and are not intended to limit the embodiments of the present disclosure.

In a video picture, a first colour component, a second colour component and a third colour component are generally used for representing a Coding Block (CB). The three colour components are respectively a luma component, a blue chroma component and a red chroma component. Specifically, the luma component is generally denoted by the symbol Y, the blue chroma component is generally denoted by the symbol Cb or U, and the red chroma component is generally denoted by the symbol Cr or V. In this way, the video picture can be represented in YCbCr format or YUV format.

In an embodiment of the present disclosure, the first colour component may be the luma component, the second colour component may be the blue chroma component, and the third colour component may be the red chroma component, which is not specifically limited by the embodiments of the present disclosure.

The following will describe the relevant technical schemes for various current prediction technologies.

It can be appreciated that considering correlations of video data in space and time and between components, there are many prediction technologies for video coding at present. For example, in H.266/VVC, the following prediction technologies are used. Herein, these kinds of prediction technologies can be divided into intra prediction technology, inter prediction technology and cross-component prediction technology.

(1) Intra Prediction Technology

Reconstructed pixels that have been encoded and then decoded in a top region and a left region of the current block are taken as a reference, to predict a current pixel value. Specifically, the intra prediction technology includes, but not limited to, following various intra prediction modes.

(a) The PLANAR mode is mainly used in the region where the picture texture is relatively smooth and changes gradually. The reference pixels on the top, bottom, left and right neighbouring boundaries of the to-be-predicted pixels in the current block are used for linear interpolation summation and average (based on position) to obtain the prediction value of the current pixel.

(b) The Direct Current (DC) mode is mainly used in a region where the picture is flat, the texture is smooth, and there is no gradient. The average value of all reference pixels in the top row and the left column of the current block is taken as the prediction value of pixels in the current block.

(c) As to the angular prediction modes. VVC adopts finer intra prediction directions, 33 angular prediction modes in HEVC are expanded to 65 angular prediction modes, and all reference pixels in the top row and the left column are used for angle projection to obtain the prediction value of the current pixel.

(d) The Position Dependent intra Prediction Combination (PDPC) is a technology for correcting prediction values. After the intra prediction, weighted average calculation in PDPC is performed on a part of intra modes to obtain the final prediction value.

(e) As to the Wide-Angle Intra Prediction (WAIP), for non-square blocks, the angular prediction range is no longer limited to a range from 45 degrees to 135 degrees. An original angular prediction mode is adaptively replaced according to the aspect ratio of a Coding Unit (CU), and 28 wide angle modes are obtained.

(f) As to the Multiple reference line intra prediction (MRL), the intra prediction is performed by using multiple selectable (top neighbouring and left neighbouring) reference lines.

(g) As to the Matrix weighted Intra Prediction (MIP), by training a matrix based on deep learning, inputs of a top row and a left column are multiplied by the trained matrix, to obtain the prediction value of the current block.

Other intra predication modes are omitted due to space limitation.

(2) Inter Prediction Technology

The pixel value of the current coding block is predicted by using reconstructed pixel values in a reference picture as a reference, in combination with motion information. Specifically, the inter prediction technology includes but is not limited to the following various inter prediction modes.

(a) As to the Merge mode of the H.266/VVC, a Motion Vector (MV) candidate list is established for the current CU, and the candidate list contains six pieces of candidate motion information. By traversing the six pieces of candidate motion information and calculating the rate-distortion cost, a candidate with the lowest rate-distortion cost (motion estimation) is finally selected as the optimal motion information of the Merge mode.

(b) As to the Merge mode with Motion Vector Difference (MMVD), first two candidates in a list of Merge candidates are selected as initial motion vectors. Then, the two initial MVs are expanded separately, and the search is mainly performed with eight offset steps in four motion directions. That is to say, an offset value (i.e., the MVD) is added to a corresponding initial MV to obtain 2×8×4=64 new motion vectors, and the MV with the lowest rate-distortion cost is selected as the optimal Merge candidate of MMVD.

(c) As to the Combined Inter and Intra Prediction (CIIP), firstly, two kinds of predictions are performed on the current CU, by one of which an intra prediction block (represented by P_intrar) is obtained using the intra Planar mode, and by the other one of which an inter prediction block (represented by P_inter) is obtained through optimal motion compensation of a motion candidate in the list of the Merge modes. Then weighted-averaging is performed on the prediction value of intra prediction and the prediction value of the inter prediction to obtain a final CIIP value.

(d) The Geometric partitioning mode (GPM) is a shape partitioning mode except square and rectangle. In the GPM, it is stipulated that 360 degrees are divided and quantized at unequal intervals to obtain 24 angles, and there are at most 4 offset parameters for each angle, resulting in a total of 64 GPM partitioning modes. The inter block is divided into two non-rectangular sub-partitions on which the unidirectional prediction is performed respectively and then weighted fusion is performed to obtain the prediction value. Therefore, the inter prediction data can be represented more flexibly, the prediction error is reduced and the coding efficiency is improved.

(e) As to the block-based Affine Motion Compensated Prediction (AMCP), an affine motion field of a block is described by motion information of two control point motion vectors (4 parameters) or three control point motion vectors (6 parameters).

(f) As to the Sub-block-based Temporal Motion Vector Prediction (SbTMVP), the motion field in a collocated picture is used to improve the motion vector prediction and merge mode of the CUs in the current picture.

(g) As to the Bi-prediction with CU-level Weight (BCW), for the bi-directional prediction mode in VVC, weighted averaging is allowed to be performed on two prediction signals.

Other inter predication modes are omitted due to space limitation.

(3) Cross-Component Prediction Technology

When a chroma component of the CU is encoded, the luma component has been encoded to obtain a luma reconstructed value. At this time, when the pixel value of the chroma component is encoded, the chroma component can be predicted by using the luma reconstructed value of the same region. This technology is referred to as Cross Component Linear Model (CCLM) chroma prediction coding. Specifically, inputs of a CCLM prediction process are the luma reconstructed value of the current block, and the top neighbouring and left neighbouring reference pixels. An output of the CCLM prediction process is the chroma prediction value of the current block. Description is made below by taking the CCLM prediction as an example.

In order to utilize correlation information between a luma component and a chroma component, H.266/VVC proposes a coding technology for chroma component, namely the CCLM technology, based on an assumption of linear relationships between luma components and chroma components of parts of the picture. Herein, in the CCLM technology, the prediction value of the chroma component of the coding block is obtained by calculating a luma reconstructed value of a CU using the established linear model. Details are as shown below.

$$\text{Pred}_C(i,j) = \alpha \cdot \text{Rec}_L(i,j) + \beta \quad (1),$$

where $\text{Pred}_C(i, j)$ represents a chroma prediction value of the coding block, $\text{Rec}_L(i, j)$ represents a luma reconstructed value (subjected to the down-sampling) in the same coding block, and $\alpha$ and $\beta$ represent model parameters.

It can be appreciated that the prediction process of CCLM technology is mainly summarized into four steps. In step 1, a range of neighbouring luma and chroma reference pixels and availability of the reference pixels are determined according to different CCLM prediction modes, and neighbouring reference pixels are selected for subsequent derivation of the linear model; in step 2, because the chroma component is half of the luma component in both a horizontal direction and a vertical direction in the colour component sampling format of 4:2:0, in order to make the luma pixel of the current CU be in a one-to-one correspondence with the chroma pixel of the current CU, it is necessary to down-sample the luma block; in step 3, the selected neighbouring reference pixels are grouped and the parameters of the linear model are derived and calculated, to obtain the linear model; in step 4, the chroma prediction value is calculated according to the obtained linear model.

Herein, the model parameters $\alpha$ and $\beta$ are derived as follows.

The CCLM mode can include three modes: LM mode, LM_T mode and LM_L mode. The main difference between these three modes lies in different ranges of selected neighbouring reference pixels. It is assumed that the width and height of the current chroma block are represented as W and H; the number of neighbouring reference pixels above of the chroma block and the number of neighbouring reference pixels on the left of the chroma block are respectively represented by $\text{Ref}_{top}$ and $\text{Ref}_{left}$; and the number of neighbouring reference pixels available on the bottom-left of the current chroma block and the number of neighbouring reference pixels available on the top-right of the current chroma block are respectively represented as numLeftBelow and numTopRight. In this way, the selection of the neighbouring reference pixels in these three modes can be described as follows:

(i) In the LM mode, what used are the neighbouring reference pixels having the number equal to the width of the current block and in the top row of the current block and the neighbouring reference pixels having the number equal to the height of the current block and in the left column of the current block, i.e., $\text{Ref}_{top}$=W, and $\text{Ref}_{left}$=H.

In the LM mode, the positions of the four luma samples are:

$$S\left[\frac{Ref_{top}}{4}, -1\right], S\left[3 * \frac{Ref_{top}}{4}, -1\right], S\left[-1, \frac{Ref_{left}}{4}\right], \text{and } S\left[-1, 3 * \frac{Ref_{left}}{4}\right].$$

(ii) In LM_T mode, only the neighbouring reference pixels in the top row of the current block are used, and the range is extended to a top-right neighbouring region of the current block, the extended range is represented as follows:

$$Ref_{top} = \begin{cases} W + numTopRight, & numTopRight < W \\ 2W, & numTopRight > W \end{cases} \quad (2)$$

In the LM_T mode, the positions of the four luma samples are:

$$S\left[\frac{Ref_{top}}{8}, -1\right], S\left[3 * \frac{Ref_{top}}{8}, -1\right], S\left[5, \frac{Ref_{left}}{8}, -1\right], \text{and } S\left[7 * \frac{Ref_{left}}{8}, -1\right].$$

(iii) In the LM_L mode, only the neighbouring reference pixels in the left column of the current block are used, and the range is extended to a bottom-left neighbouring region of the current block, the extended range is represented as follows:

$$Ref_{left} = \begin{cases} H + numLeftBelow, & numLeftBelow < H \\ 2H, & numLeftBelow > H \end{cases} \quad (3)$$

In the LM_L mode, the positions of the four luma samples are:

$$S\left[-1, \frac{Ref_{left}}{8}\right], S\left[-1, 3*\frac{Ref_{left}}{8}\right], S\left[-1, 5*\frac{Ref_{left}}{8}\right], \text{ and } S\left[-1, 7*\frac{Ref_{left}}{8}\right].$$

Then, the selected four luma samples can be down-sampled, and then compared four times, so that the smallest two samples (represented by $x^0A$ and $x^1A$) and the largest two samples (represented by $x^0B$ and $x^1B$) are found, and corresponding chroma samples are represented by $y^0A$ and $y^1A$ as well as $y^0B$ and $y^1B$, respectively. As shown in FIG. 1, the horizontal axis (i.e. the X axis) is used for representing the luma and the vertical axis (i.e. the Y axis) is used for representing the chroma. In FIG. 1, two points filled in black are the smallest two samples, and two points filled in white are the largest two samples. Between the two points filled in black, a point filled with the grid line is represented by Xa and Ya for representing a luma average value and a chroma average value respectively. Between two points filled in white, a point filled with the grid line is represented by Xb and Yb representing the luma average value and the chroma average value respectively. Herein, Xa, Ya, Xb and Yb are calculated as follows.

$$Xa=(x^0A+x^1A+1)>>1; Ya=(y^0A+y^1A+1)>>1; \text{ and}$$

$$Xb=(x^0B+x^1B+1)>>1; Yb=(y^0B+y^1B+1)>>1.$$

In this way, the model parameters can be derived from Xa, Ya, Xb and Yb. The derivation of model parameter $\alpha$ is shown in formula (4), and the derivation of model parameter $\beta$ is shown in formula (5).

$$\alpha = \frac{Y_a - Y_b}{X_a - X_b} \quad (4)$$

$$\beta = Y_b - \alpha \cdot X_b \quad (5)$$

After the $\alpha$ and $\beta$ are obtained, the chroma prediction value of the current block can finally be calculated according to formula (1).

Among the existing prediction technologies, the existing prediction algorithms do not fully consider the correlation between different components, which results in a reduction in accuracy of inter-component prediction, thus reducing the compression and coding efficiency. In addition, there is obvious discontinuity between the prediction value of the current block determined by the existing CCLM prediction mode and values of reference samples adjacent to the current block, which reduces the prediction accuracy and reduces the compression and coding efficiency.

Based on this, the embodiments of the disclosure provide a picture prediction method, which can be applied to both an encoder and a decoder. The basic idea of the method includes: after an initial prediction value of a to-be-predicted colour component of a current block is determined; a sample associated with a reference colour component of the current block is determined; side information of the current block is determined according to the sample associated with the reference colour component; the initial prediction value is filtered by using a preset network model and the side information of the current block, to obtain a target prediction value of the to-be-predicted colour component of the current block; and The to-be-predicted colour component of the current block is encoded according to the target prediction value. In this way, the correlation between colour components can be used for prediction enhancement on the initial prediction value according to the side information of the current block and the preset network model, so that the enhanced target prediction value is closer to the true value, thereby effectively improving the prediction accuracy, improving the encoding and decoding efficiency and improving the overall encoding and decoding performance.

Embodiments of the present disclosure will be described in detail below with reference to the accompanying drawings.

Figure 2A:
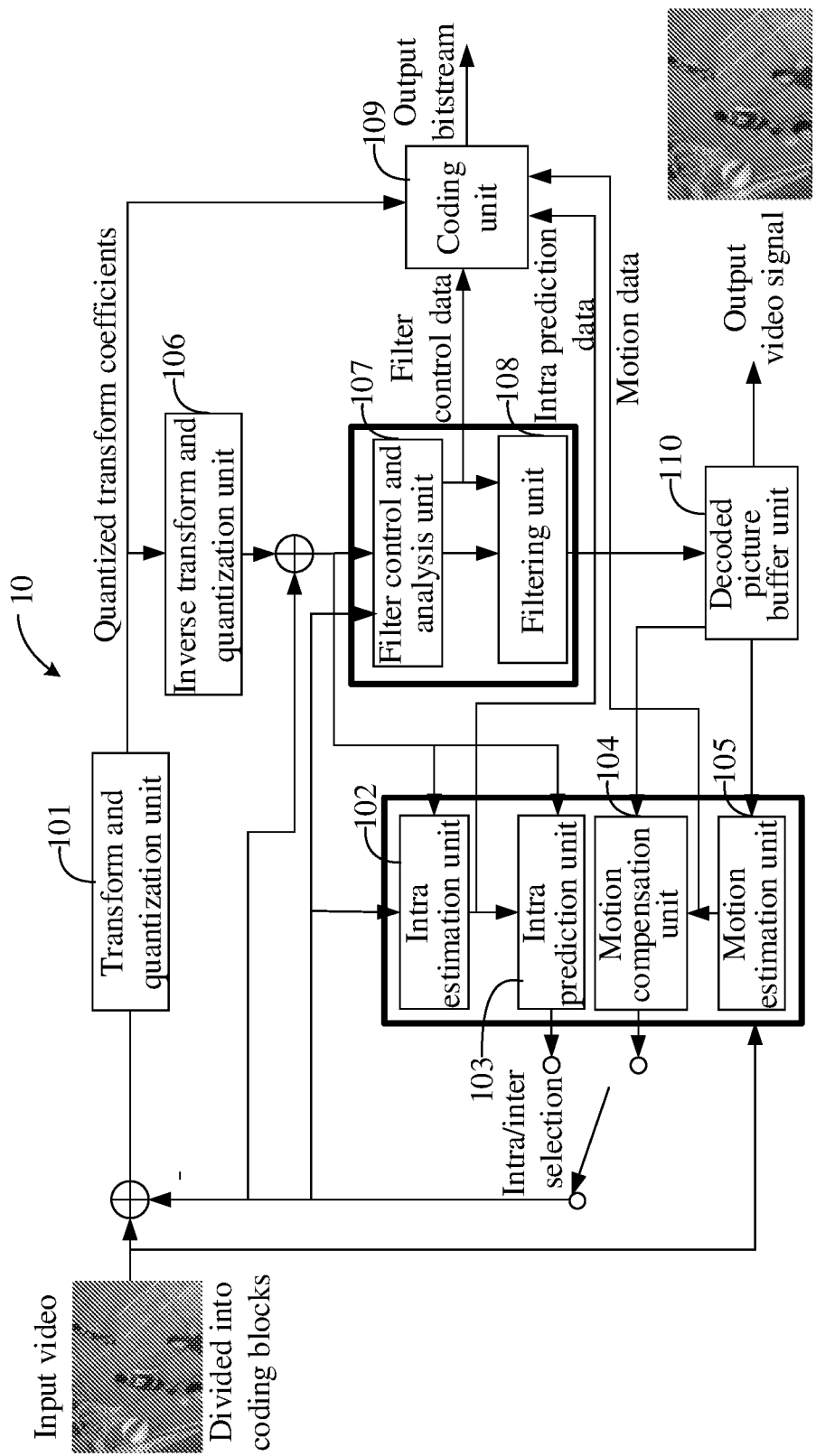
FIG. 2A is a block diagram of a video encoding system according to an embodiment of the present disclosure.

With reference to reference to FIG. 2A, an example of a block diagram of a video encoding system according to an embodiment of the present disclosure is shown. As shown in FIG. 2A, the video encoding system 10 includes a transform and quantization unit 101, an intra estimation unit 102, an intra prediction unit 103, a motion compensation unit 104, a motion estimation unit 105, an inverse transform and inverse quantization unit 106, a filter control and analysis unit 107, a filtering unit 108, an coding unit 109, a decoded picture buffer unit 110 and the like. The filtering unit 108 can implement a deblocking filter, a Sample Adaptive Offset (SAO) filter, Adaptive loop Filter (ALF) and the like. The coding unit 109 can implement header information coding and Context-based Adaptive Binary Arithmetic Coding (CABAC). For the input original video signal, a video coding block can be obtained by dividing by a Coding Tree Unit (CTU), the video coding block is then transformed by the transform and quantization unit 101 on residual pixel information obtained after the intra prediction or inter prediction is performed on the video coding block, the transformation includes transforming the residual information from a pixel domain to a transform domain and quantizing the obtained transform coefficients to further reduce the bit rate. The intra estimation unit 102 and the intra prediction unit perform intra prediction on the video coding block. Specifically the intra estimation unit 102 and the intra prediction unit are configured to determine an intra prediction mode to be used to encode the video coding block. The motion compensation unit 104 and the motion estimation unit 105 are configured to perform inter prediction coding on the received video coding block with respect to one or more blocks of one or more reference pictures to provide temporal prediction information. A motion estimation performed by the motion estimation unit 105 is a process of generating motion vectors configured to estimate the motion of the video coding block, and then a motion compensation is performed by the motion compensation unit 104 based on the motion vectors determined by the motion estimation unit 105. After the intra prediction mode is determined, the intra prediction unit 103 is further configured to supply the selected intra prediction data to the coding unit 109, and the motion estimation unit 105 also sends the motion vector data determined by calculation to the coding unit 109. Furthermore, the inverse transform and inverse quantization Unit 106 is configured to the reconstruct the video coding block, a residual block is reconstructed in the pixel domain, blocking artifacts is removed for the reconstructed residual block by a filter control and analysis unit 107 and a filtering unit 108, and then the reconstructed residual block is added to a prediction block in a picture of a decoded picture buffer unit 110 to generate a reconstructed video coding block. The coding unit 109 is configured to encode various coding parameters and quantized transform coefficients. In the CABAC-based coding algorithm, the context content can be based on neighbouring coding blocks, and the coding unit 109 is configured to encode information indicating the determined intra prediction mode and output the bitstream of the video signal. The decoded picture buffer unit 110 is configured to store the reconstructed video coding block for prediction reference. As video picture coding proceeds, new reconstructed video coding blocks are continuously generated and all of these reconstructed video coding blocks are stored in the decoded picture buffer unit 110.

Figure 2B:
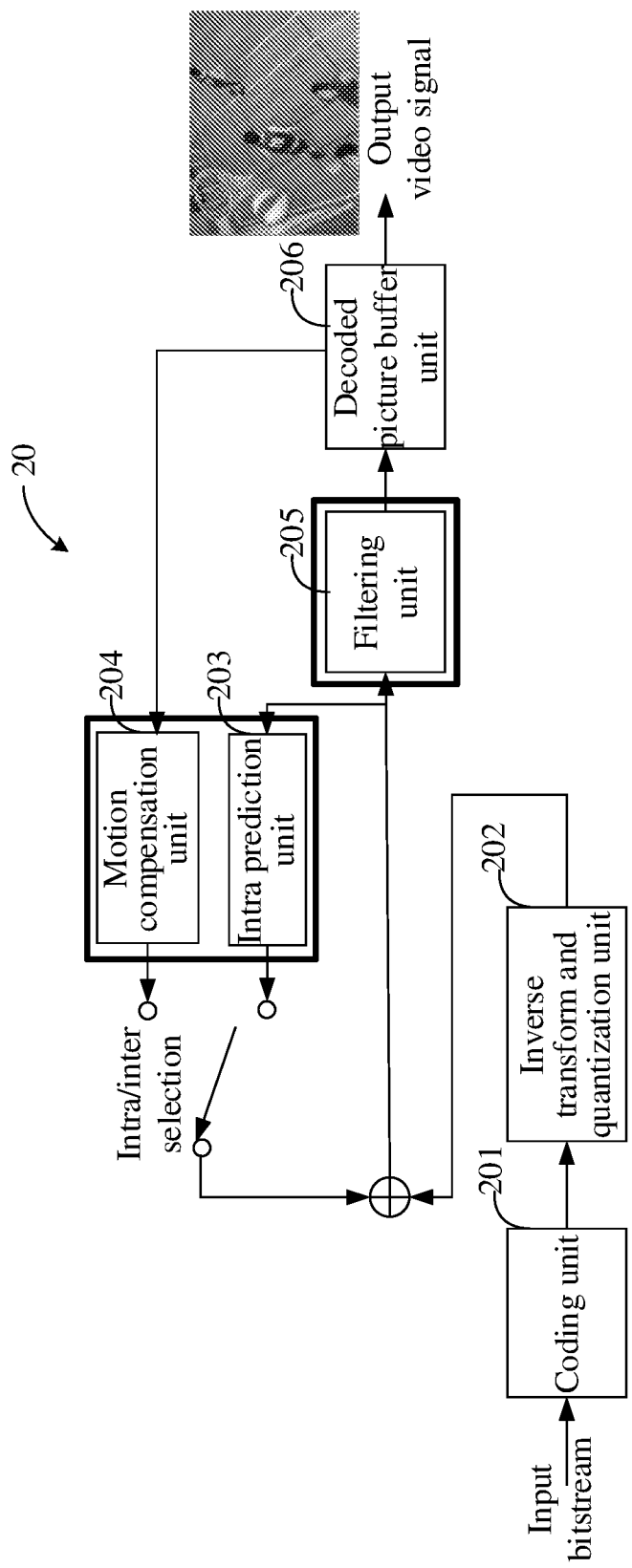
FIG. 2B is a block diagram of a video decoding system according to an embodiment of the present disclosure.

With reference to FIG. 2B, an example of a block diagram of a video decoding system according to an embodiment of the present disclosure is shown. As shown in FIG. 2B, the video decoding system 20 includes a coding unit 201, an inverse transform and inverse quantization unit 202, an intra prediction unit 203, a motion compensation unit 204, a filtering unit 205, a decoded picture buffer unit 206, and the like. The coding unit 201 can implement header information coding and CABAC. The filtering unit 205 can implement the deblocking filtering, the SAO filter, the ALF filtering, and the like. After the input video signal is encoded in FIG. 2A, a bitstream of the video signal is output. After the bitstream is input into a video decoding system 20, the bitstream first passes through the coding unit 201 to obtain decoded transform coefficients. The transform coefficients are processed by the inverse transform and inverse quantization unit 202 to generate a residual block in the pixel domain. The intra prediction unit 203 may be configured to generate prediction data for the current video coding block based on the determined intra prediction mode and data of previously decoded block blocks obtained from the current picture. The motion compensation unit 204 determines prediction information for the video coding block by parsing the motion vector and other associated syntax elements and uses the prediction information to generate a prediction block of video coding block being decoded. Forming a decoded video block by summing a residual block from the inverse transform and inverse quantization unit 202 and the prediction block generated by the intra prediction unit 203 or the motion compensation unit 204. The decoded video signal passes through the filtering unit 205 so as to remove the blocking artifacts and the video quality can be improved. The decoded video block is then stored in the decoded picture buffer unit 206 configured to store a reference picture for subsequent intra prediction or motion compensation, and output the video signal, i.e. the restored original video signal is obtained.

It is to be noted that the picture prediction method in the embodiments of the present disclosure enhances the initial prediction value after each prediction technology is performed. Herein, the picture prediction method in embodiments of the present disclosure may be applied to a video encoding system, that is, the picture prediction method may be applied after the prediction part of FIG. 2A (such as the black bold block diagram part in FIG. 2A), or may also be applied before or after the loop filtering part (such as the gray bold block diagram part in FIG. 2A). The picture prediction method in the embodiment of the present disclosure may also be applied to a video decoding system, i.e. the picture prediction method may be applied after the prediction part of FIG. 2B (such as the black bold block diagram part in FIG. 2B), or may also be applied before or after the loop filtering part (such as the gray bold block diagram part in FIG. 2B). That is to say, the picture prediction method in the embodiments of the present disclosure can be applied to a video encoding system, a video decoding system, or even a video encoding system and a video decoding system simultaneously, which is not specifically limited in the embodiments of the present disclosure.

It is to be further noted that the "first", "second" and "third" mentioned throughout the description are only for distinguishing different characteristics, and do not have the functions of limiting priority, sequence and size relationship.

In an embodiment of the present disclosure, the picture prediction method provided by the embodiments of the present disclosure is applied to a video coding device, i.e. an encoder. The function implemented by the method can be implemented by calling computer programs by a first processor in the encoder. Of course, the computer programs can be stored in a first memory. It can be seen that the encoder includes at least the first processor and the first memory.

Figure 3:
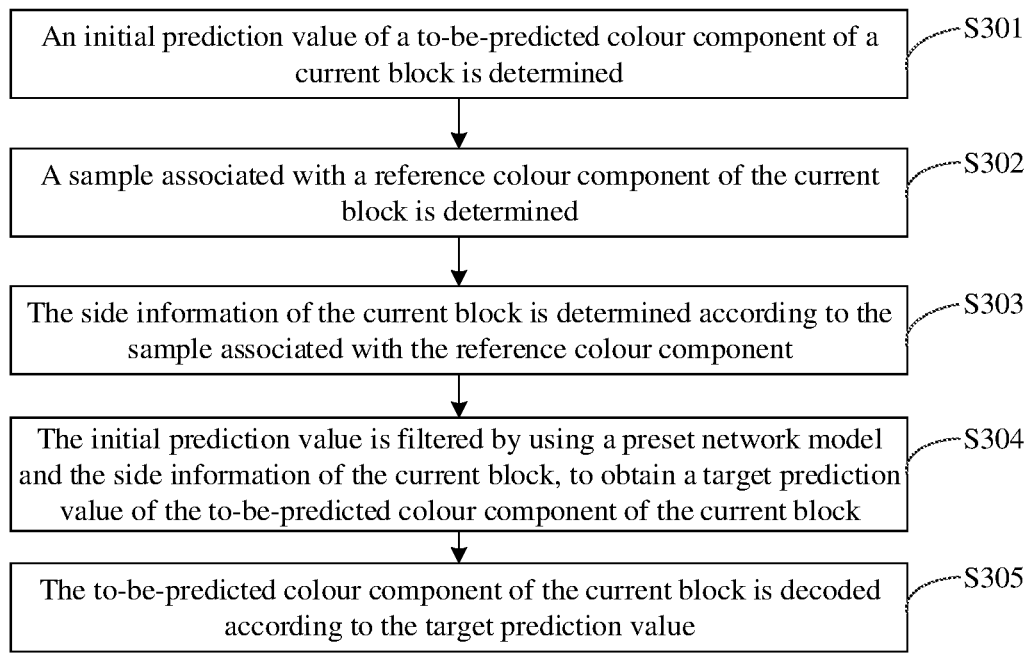
FIG. 3 is a flowchart of a picture prediction method according to an embodiment of the present disclosure.

Based on the above application scenario example of FIG. 2A, with reference to FIG. 3, a flowchart of a picture prediction method according to an embodiment of the present disclosure is shown. As shown in FIG. 3, the method includes operations S301 to S305.

In S301, an initial prediction value of a to-be-predicted colour component of a current block is determined.

It is to be noted that a video picture can be divided into multiple picture blocks, and each picture block to be encoded can be referred to as a Coding Block (CB). Herein, each coding block may include a first colour component, a second colour component and a third colour component. The current block is a coding block in the video picture whose first colour component, second colour component or third colour component are currently to be predicted.

It is assumed that prediction of the first colour component of the current block is performed, and that the first colour component is a luma component, i.e. the to-be-predicted colour component is a luma component, then the current block can also be referred to as a luma block. Alternatively, it is assumed that prediction of the second colour component of the current block is performed, and that the second colour component is a chroma component, i.e. the to-be-predicted colour component is a chroma component, then the current block may also be referred to as a chroma block.

In some embodiments, the operation of determining the initial prediction value of the to-be-predicted colour component of the current block includes the following two operations.

A target prediction mode of the current block is determined.

The to-be-predicted colour component of the current block is predicted according to the target prediction mode, to determine the initial prediction value of the to-be-predicted colour component of the current block.

It is to be noted that the target prediction mode is used to indicate the prediction mode used for coding prediction of the current block. Herein, for the determination of the target prediction mode, a simple decision strategy can be adopted, such as, a determination according to the distortion value; or a complex decision strategy may be adopted, such as a determination based on the cost result of Rate Distortion Optimization (RDO), which is not limited in the embodiments of the present disclosure. In general, the target prediction mode of the current block can be determined by RDO manner in the embodiments of the present disclosure.

Specifically, in some embodiments, the operation of determining the target prediction mode of the current block includes the following three operations.

The to-be-predicted colour component of the current block is determined.

The to-be-predicted colour component is pre-coded by using one or more candidate prediction modes respectively, and a rate-distortion cost result corresponding to each of the candidate prediction modes is determined.

An optimal rate-distortion cost result is selected from the rate-distortion cost results, and a candidate prediction mode corresponding to the optimal rate-distortion cost result is determined as the target prediction mode of the current block.

It is to be noted that, on the encoder side, one or more candidate prediction modes can be configured to pre-code the to-be-predicted colour components of the current block respectively. Herein, the candidate prediction modes generally include an intra prediction mode, an inter prediction mode and an inter-component prediction mode. The intra prediction mode may include PLANAR mode, DC mode, angular prediction mode, PDCP mode, WAIP mode, MRL mode and MIP mode, etc. The inter prediction mode may include Merge mode, MMVD mode, CIIP mode, GPM mode, SbTMVP mode and BCW mode, etc. The inter-component prediction mode may include a prediction mode within a same colour component and a prediction mode between different colour components.

That is to say, in some embodiments, the target prediction mode may be an intra prediction mode or an inter prediction mode. Furthermore, the target prediction mode may be the prediction mode within a same colour component or the prediction mode between different colour components. In general, inter-component prediction mode is usually the prediction mode between different colour components, such as CCLM mode.

In this way, after the to-be-predicted colour component is pre-coded by using one or more candidate prediction modes respectively, the rate-distortion cost result corresponding to each of the candidate prediction modes can be obtained. Then, the optimal rate-distortion cost result is selected from the rate-distortion cost results, and the candidate prediction mode corresponding to the optimal rate-distortion cost result is determined as the target prediction mode of the current block. In addition, after the to-be-predicted colour component is pre-coded by using one or more candidate prediction modes respectively, a distortion value corresponding to each candidate prediction mode can be obtained; then, a minimum distortion value is selected from the obtained distortion values, and a candidate prediction mode corresponding to the minimum distortion value is determined as the target prediction mode of the current block. In this way, the current block is finally encoded by using the determined target prediction mode, so that the prediction residual error is smaller and the coding efficiency can be improved.

In operation S302, a sample associated with a reference colour component of the current block is determined.

It is to be noted that the reference colour component includes one or more colour components in a current picture that are different from the to-be-predicted colour component. The current picture is a picture where the current block is located. The current picture herein is a picture of which different colour components can be used as inputs for filtering enhancement in embodiments of the present disclosure.

In some embodiments, the operations of determining the sample associated with the reference colour component of the current block include the following operation.

The sample associated with the reference colour component is determined according to at least one of: a prediction value of the reference colour component of the current block, or a reconstructed value of the reference colour component of the current block.

It is to be noted that the prediction value of the reference colour component herein can be interpreted as "the prediction value determined according to the prediction mode of the reference colour component of the current block", and the reconstructed value of the reference colour component herein can be interpreted as "a reconstructed value obtained by encoding and reconstruction after the prediction value is obtained according to the prediction mode of the reference colour component of the current block". That is to say, the sample associated with the reference colour component may be determined based on the prediction value of the reference colour component of the current block, or may be based on the reconstructed value of the reference colour component of the current block, or may also be based on the prediction value and the reconstructed value of the reference colour component of the current block.

Furthermore, in some embodiments, the operation of determining the sample associated with the reference colour component of the current block includes the following operation.

The sample associated with the reference colour component is determined according to at least one of: a prediction value of the reference colour component corresponding to a pixel adjacent to the current block, or a reconstructed value of the reference colour component corresponding to the pixel adjacent to the current block.

It is to be noted that, the prediction value of the reference colour component can be interpreted as "a prediction value determined according to a prediction mode of the reference colour component corresponding to a picture block where the pixel adjacent to the current block is located", Herein, the reconstructed value of the reference colour component can be interpreted as "the reconstructed value obtained by coding and reconstruction after the prediction value is obtained according to the prediction mode of the reference colour component corresponding to the picture block where the pixel adjacent to the current block is located". That is to say, the sample associated with the reference colour component may be determined according to: the prediction value of the reference colour component corresponding to a pixel adjacent to the current block, the reconstructed value of the reference colour component corresponding to the pixel adjacent to the current block, or the prediction value and reconstructed value of the reference colour component corresponding to the pixel adjacent to the current block.

It is to be further noted that the pixel adjacent to the current block includes at least one row of pixels adjacent to the current block. Alternatively, the pixel adjacent to the current block includes at least one column of pixels adjacent to the current block.

In the embodiment of that present disclosure, specifically, for the determination of the sample associated with the reference colour component of the current block, the sample associated with the reference colour component of the current block may include at least one of the following: a reconstructed value of the reference colour component of the current block, a colour component value corresponding to at least one row of pixels adjacent to the current block, and a colour component value corresponding to at least one column of pixels adjacent to the current block. The reference colour component is different from the to-be-predicted colour component, and a colour component value may include a reference value of the to-be-predicted colour component and/or a reference value of the reference colour component. The reference value herein can be a prediction value or a reconstructed value.

In other words, the sample associated with the reference colour component of the current block includes at least two of: the reconstructed value of the reference colour component of the current block, a reference colour component value corresponding to at least one row of pixels adjacent to the current block, or a reference colour component value corresponding to at least one column of pixels adjacent to the current block. The reference colour component of the current block is different from the to-be-predicted colour component.

Additionally, for the inter prediction mode, the reference colour component may include one or more colour components of the reference picture. The reference picture is different from the current picture where the current block is located.

It is to be noted that the reference picture here is different from the current picture where the current block is located, and the reference picture is a picture of which different colour components can be used as inputs for filtering enhancement in embodiments of the present disclosure.

In some embodiments, the operation of determining the sample associated with the reference colour component of the current block includes the following operation.

The sample associated with the reference colour component is determined according to reconstructed values of one or more colour components in a prediction reference block of the current block.

Furthermore, in some embodiments, the method may further include the following two operations.

In response to the target prediction mode being the inter prediction mode, an inter prediction mode parameter of the current block is determined, where the inter prediction mode parameter includes a reference picture index corresponding to the reference picture and a motion vector indicating the prediction reference block in the reference picture.

A determined inter prediction mode parameter is signalled.

It is to be noted that for the inter prediction mode, a reference picture is needed besides the current picture where the current block is located. The reference picture index is a picture index number corresponding to the reference picture, and the motion vector is used to indicate the prediction reference block in the reference picture.

It is to be further noted that for the inter prediction mode, the reference picture index and the motion vector may be used as the inter prediction mode parameters and signalled, so as to be transmitted to the decoder from the encoder.

Thus, after the sample associated with the reference colour component of the current block is determined, the side information of the current block can be determined according to the sample associated with the reference colour component.

In operation S303, the side information of the current block is determined according to the sample associated with the reference colour component.

It is to be noted that in the embodiments of the present disclosure, the technical key of the present disclosure is to use relevant parameters of one colour component to perform enhancement filtering on the initial prediction value of another colour component. Herein, the relevant parameters of "one colour component" are mainly the side information of the current block. On one hand, the sample associated with the reference colour component can be directly determined as the side information of the current block. On the other hand, the sample associated with the reference colour component may be filtered such as up-sampled/down-sampled, and the filtered sample can be determined as the side information of the current block, which is not limited in the embodiments of the present disclosure.

That is to say, in a possible implementation, the operation of determining the side information of the current block according to the sample associated with the reference colour component may include determining the sample associated with the reference colour component as the side information of the current block.

In another possible implementation, the operation of determining the side information of the current block according to the sample associated with the reference colour component includes performing a first filtering processing on the sample associated with the reference colour component according to a colour component sampling format, to obtain a filtered sample associated with the reference colour component; and determining the filtered sample associated with the reference colour component as the side information of the current block.

It is to be noted that the colour component may include a luma component, a blue chroma component, and a red chroma component. The colour component sampling format may include a 4:4:4 format, a 4:2:2 format and a 4:2:0 format. The 4:4:4 format represents that neither the blue chroma component nor the red chroma component is down-sampled with respect to the luma component. The 4:2:2 format represents that the blue chroma component or the red chroma component is horizontally down-sampled at 2:1 with respect to the luma component without vertical down-sampled. The 4:2:0 format represents that a the blue chroma component or the red chroma component is horizontally down-sampled at 2:1 and vertical down-sampled at 2:1 with respect to the luma component. That is to say, the 4:2:2 format and the 4:2:0 format are suitable for the above-mentioned first filtering processing, while the 4:4:4 format is not suitable for the above-mentioned first filtering processing.

Furthermore, in some embodiments, the method may further include the fowling operation.

The colour component sampling format is signalled.

Alternatively, in some embodiments, the method may further include the fowling two operations.

A value of a bit field to be signalled is determined, where the value of the bit field is used for indicating the colour component sampling format.

The value of the bit field is signalled.

That is to say, on the encoder side, after the colour component sampling format is determined, the colour component sampling format is signalled, or, a value of a bit field indicating a colour component sampling format is determined, and is signalled. Then the bitstream is transmitted to the decoder from the encoder, so that the decoder can directly obtain the colour component sampling format after the bitstream is parsed.

It is to be further noted that since the resolution of the luma component is different from the resolution of the chroma component (such as the blue chroma component or the red chroma component), a first filtering processing, such as an up-sampling processing or down-sampling processing, is required to be performed on the sample associated with the reference colour component according to specific conditions. Specifically, in some embodiments, the operation of performing the first filtering processing on the sample associated with the reference colour component may include the following three operations.

In response to a resolution of the initial prediction value being smaller than a resolution of the sample associated with the reference colour component, the sample associated with the reference colour component is down-sampled.

In response to the resolution of the initial prediction value being greater than the resolution of the sample associated with the reference colour component, the sample associated with the reference colour component is up-sampled.

In response to the resolution of the initial prediction value being equal to the resolution of the sample associated with the reference colour component, the filtered sample associated with the reference colour component is set to be equal to the sample associated with the reference colour component.

In an embodiment of the present disclosure, the resolution of the filtered sample associated with the reference colour component is equal to a resolution of the initial prediction value.

Exemplarily, if the to-be-predicted colour component is a chroma component and the reference colour component is a luma component, then the sample associated with the reference colour component needs to be down-sampled, and the resolution of the luma component subjected to the down-sampling processing is identical to that of the resolution of the chroma component. Alternatively, if the to-be-predicted colour component is the luma component and the reference colour component is a chroma component, then the sample associated with the reference colour component needs to be up-sampled, and the resolution of the chroma component subjected to the up-sampling processing is identical to the resolution of the luma component. In addition, if the to-be-predicted colour component is the blue chroma component and the reference colour component is the red chroma component, then since the resolution of the blue chroma component is identical to the resolution of the red chroma component, the first filtering processing is not required for the sample associated with the reference colour component at this time, i.e., the filtered sample associated with the reference colour component can be set to be equal to the sample associated with the reference colour component before filtering.

In this way, after the sample associated with the reference colour component is determined, side information of the current block can be determined according to the sample associated with the reference colour component, so as to perform the filtering enhancement on the initial prediction value of the to-be-predicted colour component by using the side information of the current block.

In operation S304, the initial prediction value is filtered by using a preset network model and the side information of the current block, to obtain a target prediction value of the to-be-predicted colour component of the current block.

It is to be noted that a preset network model is used in the embodiments of the present disclosure, the preset network model can be referred to as a neural network model with skip connections for local data or a semi-residual network, and then the filtering enhancement is performed on the initial prediction value in combination with the side information of the current block to improve the prediction accuracy.

It is to be further noted that the side information of the current block is not equivalent to the "side information" commonly understood by people in the art. The side information in the embodiments of the present disclosure is mainly used for performing filtering enhancement on the prediction value of "one colour component" by using "another colour component". In addition, the side information may be parameters associated with "one or more colour components", which may be parameters for obtaining the prediction value or the reconstructed value of "one or more colour components", or may directly be the prediction value or the reconstructed value of "one or more colour components". That is to say, in the embodiments of the present disclosure, the side information of the current block may be determined according to the sample associated with the reference colour component is determined.

As to the preset network model, before the operation S304, the method may further include determining the preset network model.

In the embodiments of the present disclosure, the preset network model is obtained through model training. In some embodiments, the operation of determining the preset network model may specifically the following three operations.

A training sample set is acquired, where the training sample set includes one or more pictures.

An initial network model is constructed, and the initial network model is trained by using the training sample set.

A trained initial network model is determined as the preset network model.

It is to be noted that the training sample set may include one or more pictures. The training sample set may be a training sample set stored locally in an encoder, a training sample set acquired from a remote server according to link or address information, or even a set of decoded picture samples in a video, which is not specifically limited in the embodiments of the present disclosure.

In this way, after the training sample set is acquired, the initial network model can be trained by using the training sample set through the cost function. When a loss of the cost function converges to a certain preset threshold, the trained initial network model is the preset network model. Herein, the cost function may be a rate-distortion cost function and the preset threshold may be specifically set according to the actual situation, which is not limited in the embodiments of the present disclosure.

It is to be further noted that, when the preset network model is determined, the network model parameters of the preset network model can be determined first. In some embodiments, the operation of determining the preset network model may include the following two operations.

The network model parameters are determined.

The preset network model is constructed according to the determined network model parameters.

In the embodiment of the present disclosure, the network model parameters may be determined through model training. Specifically, in some embodiments, the operation of determining the preset network model may include acquiring a training sample set; and constructing an initial network model. The initial network model includes model parameters. The initial network model is trained by using the training sample set, and the model parameters of the trained initial network model are determined as the network model parameters.

At this time, on the encoder side, after the network model parameters are obtained through model training, the network model parameters are signalled. In this way, the decoder side can directly obtain the network model parameters by parsing the bitstream, and the preset network model can be constructed without model training at the decoder side.

In some embodiments, the preset network model may include a neural network model and a first adder.

It is to be noted that the neural network model includes at least one of: a convolution layer, a residual layer, an average pooling layer, or a sampling conversion module. Herein, a Convolutional Neural Network (CNN) is a kind of Feedforward Neural Network with convolution calculation and having a depth structure, which is one of the representative algorithms of deep learning. The CNN has the ability of representation learning, and can perform the shift-invariant classification on the input information according to its hierarchical structure, therefore, the CNN is also referred to as "Shift-Invariant Artificial Neural Networks (SIANN)". The Neural network has developed to a stage of deep learning. The deep learning is a branch of machine learning, and is an algorithm that tries to abstract data at a high level by using multiple processing layers including complex structures or multiple nonlinear transformations. The powerful expression ability of deep learning makes it perform well in video and picture processing.

It is to be further noted that the residual layer may be composed of an activation function, a convolution layer and a second adder, which is not specifically limited herein. The activation function can be the Rectified Linear Unit (ReLU), which can also be referred to as Modified Linear Unit. The ReLU is a commonly used activation function in artificial neural networks, and usually is a nonlinear function represented by a ramp function and variants of the ramp function.

Furthermore, in some embodiments, the operation of filtering the initial prediction value by using the preset network model and the side information of the current block, to obtain the target prediction value of the to-be-predicted colour component of the current block may include the following operation.

The side information of the current block and the initial prediction value of the to-be-predicted colour component are inputted into the preset network model to output the target prediction value of the to-be-predicted colour component by the preset network model.

It is to be noted that, since the preset network model may include the neural network model and the first adder, the operation of inputting the side information of the current block and the initial prediction value of the to-be-predicted colour component into the preset network model to output the target prediction value of the to-be-predicted colour component by the preset network model may specifically include: the side information and the initial prediction value are inputted into the neural network model to output an intermediate value; and addition processing is performed on the intermediate value and the initial prediction value by the first adder to obtain the target prediction value.

Figure 4:
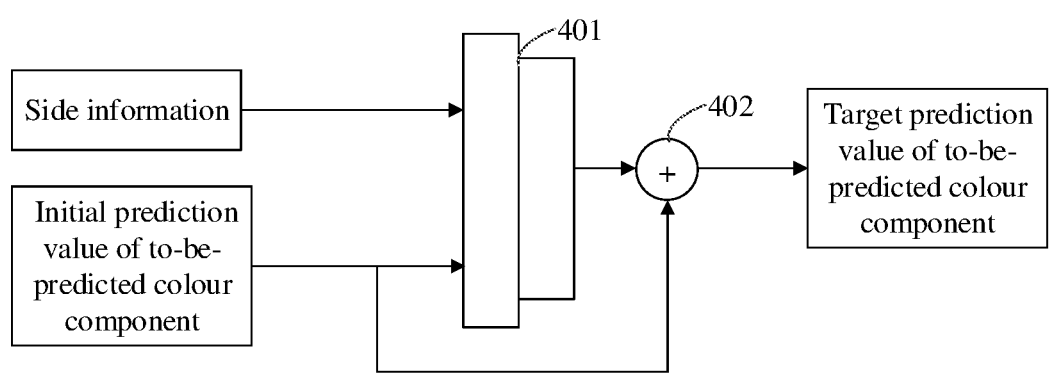
FIG. 4 is a schematic diagram of an application scenario of a picture prediction method according to an embodiment of the present disclosure.

That is to say, as shown in FIG. 4, the preset network model includes the neural network model 401 and the first adder 402. The inputs are side information and the initial prediction value of the to-be-predicted colour component; after the processing performed by the neural network model 401, the intermediate value can be obtained; the addition processing is performed on the intermediate value and the initial prediction value of the to-be-predicted colour component by the first adder 402, and the final output is the target prediction value of the to-be-predicted colour component. In other words, the preset network model implements the reduction from two channels of inputs to one channel of output.

In operation S305: the to-be-predicted colour component of the current block is decoded according to the target prediction value.

It is to be noted that after the target prediction value of the to-be-predicted colour component is obtained, the to-be-predicted colour component of the current block can be encoded. Specifically, a residual value of the current block (i.e., a difference between the target prediction value and the true value) may be calculated according to the target prediction value, and then the residual value is encoded and signalled.

The embodiment provides a picture prediction method applied to an encoder. An initial prediction value of a to-be-predicted colour component of a current block is determined; a sample associated with a reference colour component of the current block is determined; side information of the current block is determined according to the sample associated with the reference colour component; the initial prediction value is filtered by using a preset network model and the side information of the current block, to obtain a target prediction value of the to-be-predicted colour component of the current block; and the to-be-predicted colour component of the current block is encoded according to the target prediction value. In this way, the correlation between colour components can be used for prediction enhancement on the initial prediction value according to the side information of the current block and the preset network model, so that the enhanced target prediction value is closer to the true value, thereby effectively improving the prediction accuracy, improving the encoding and decoding efficiency and improving the overall encoding and decoding performance.

In another embodiment of the present disclosure, the picture prediction method of the embodiment of the present disclosure will be described in detail in combination with several specific application scenarios.

According to the technical scheme of the embodiments of the disclosure, the neural network technology with skip connections for local data (or referred to as the semi-residual network) is used for performing filtering enhancement on the initial prediction value subjected to the prediction in combination with the correlation between the side information around the current block and the current block, so as to improve the prediction accuracy. That is to say, embodiments of the present disclosure focus on filtering an initial prediction value of a colour component by using one or more other colour components that are different from the colour component. The initial prediction value can be obtained by using ordinary non-inter-component prediction mode (such as intra prediction mode and inter prediction mode) or by using inter-component prediction mode (such as CCLM mode).

Figure 5:
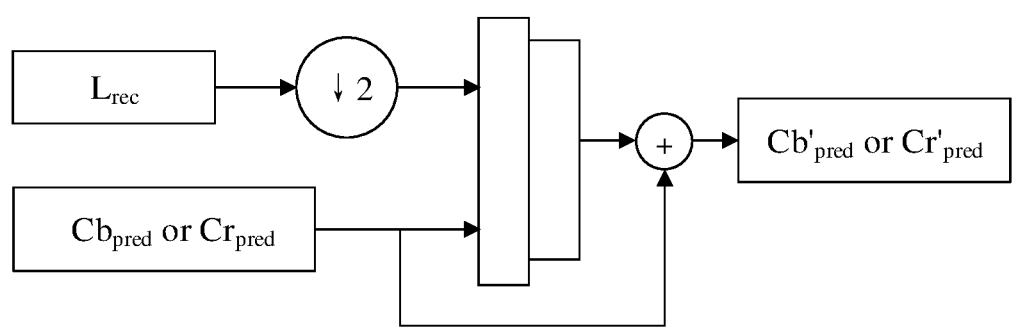
FIG. 5 is a schematic diagram of another application scenario of a picture prediction method according to an embodiment of the present disclosure.

(1) With reference to FIG. 5, a schematic diagram of another application scenario of a picture prediction method according to an embodiment of the present disclosure is shown. It is assumed that the to-be-predicted colour component is a chroma component (represented by Cb or Cr) and the reference colour component is a luma component (represented by L) of the current block. Note that the initial prediction values ($Cb_{pred}$ and $Cr_{pred}$) of the chroma blocks herein may be predicted by using the CCLM mode or may be predicted using other intra prediction modes or other inter prediction modes.

In a possible implementation, it is assumed that the side information of the current block is the reconstructed value of the luma component of the current block and the to-be-predicted colour component is the chroma component.

Then, the operation of filtering the initial prediction value by using the preset network model and the side information of the current block, to obtain the target prediction value of the to-be-predicted colour component of the current block may include: the following two operations.

The down-sampling filtering processing is performed based on the colour component sampling format to obtain the filtered reconstructed value.

The filtered reconstructed value and the initial prediction value of the chroma component are inputted into the preset network model, and the target prediction value of the chroma component is outputted through the preset network model.

In another possible implementation, it is assumed that the side information of the current block is the reconstructed value of the luma component of the current block and the to-be-predicted colour component is the chroma component.

Then, the operation of filtering the initial prediction value by using the preset network model and the side information of the current block, to obtain the target prediction value of the to-be-predicted colour component of the current block may include: the following two operations.

The up-sampling filtering processing is performed based on the colour component sampling format to obtain the filtered initial prediction value.

The reconstructed value of the luma component and the filtered initial prediction value of the current block are input into the preset network model, and the target prediction value of the chroma component is outputted through the preset network model.

As shown in FIG. 5, the side information of the current block is the reconstructed value (represented by $L_{rec}$) of the luma component and the initial prediction value of the to-be-predicted colour component of the current block is the initial prediction value (represented by $Cb_{pred}$ or $Cr_{pred}$) of the chroma component. At this time, the reconstructed value of the luma component of the current block is used for refining the initial prediction value subjected to the chroma component prediction, and the enhanced target prediction value ($Cb_{pred}'$ or $Cr_{pred}'$) of the chroma component can be obtained after passage of the preset network model shown in FIG. 5.

Specifically, the inputs of the preset network model are the reconstructed value $L_{rec}$ of the luma component of the current block and the prediction value $Cb_{pred}$ or $Cr_{pred}$ of the chroma component of the current block. For the reconstructed value $L_{rec}$ of the luma component of the current block, depending on different colour component sampling formats, such as the 4:2:0 format, after two-times down-sampling (if it is a 4:4:4 format, the down-sampling step is unnecessary), a size of the luma component is aligned with a size of the chroma component. Since the preset network model effectively learns the correlation of the two inputs and simultaneously one of the inputs of the preset network model (the prediction value $Cb_{pred}$ or $Cr_{pred}$ of the chroma component) is connected to the output of the model, the output $Cb_{pred}'$ or $Cr_{pred}'$ is closer to the true chroma value (or the original chroma value) of the current block than the original prediction value $Cb_{pred}$ or $Cr_{pred}$ of the chroma component.

Figure 6:
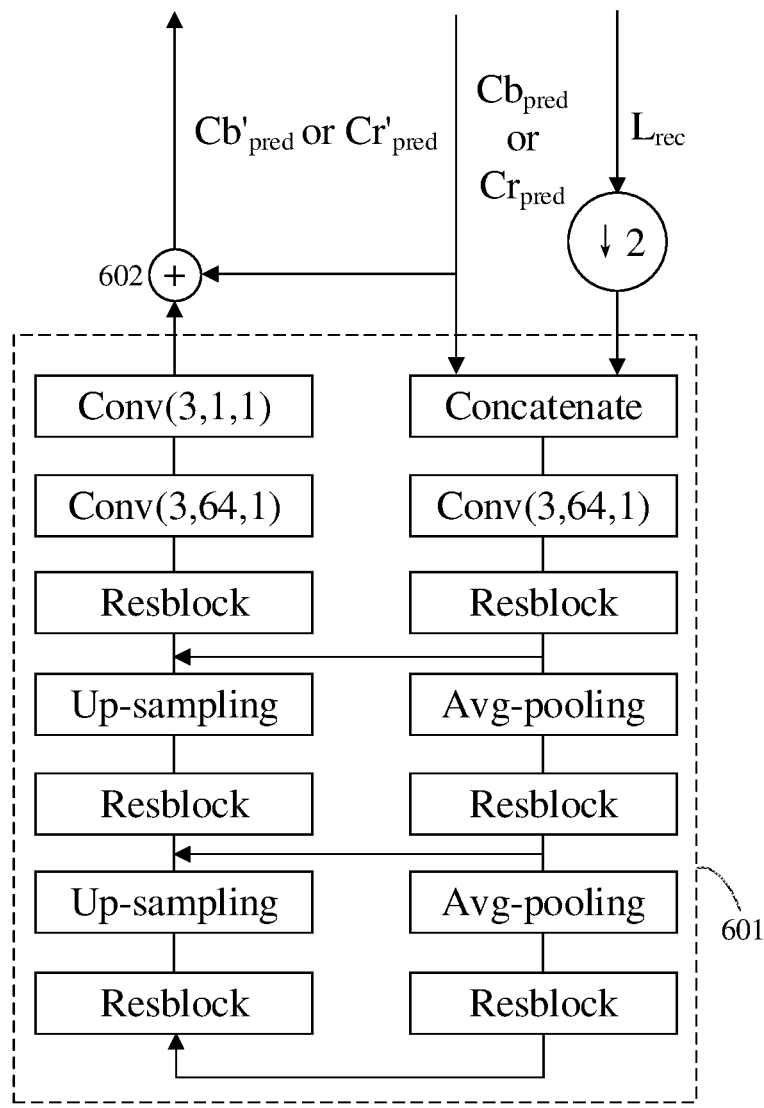
FIG. 6 is a schematic diagram of a network structure of a preset network model according to an embodiment of the disclosure.

Furthermore, as shown in FIG. 6, a schematic diagram of a network structure of a preset network model according to an embodiment of the disclosure is shown. Herein, the preset network model may include a neural network model 601 and a first adder 602. The neural network model 601 may be formed by stacking a convolution layer, a residual layer, an average pooling layer and a sampling conversion module. One of the inputs of the preset network model (the prediction value $Cb_{pred}$ or $Cr_{pred}$ of the chroma component) is connected to the output of the preset network model and is added with the output of the neural network model to obtain $Cb_{pred}'$ or $Cr_{pred}'$. The residual layer can also be referred to as a Residual Block (Resblock), an example of the network structure of which is shown in FIG. 7.

It is to be noted that in FIG. 6, in the neural network model 601, for two inputs ($L_{rec}$ and $Cb_{pred}$ or $Cr_{pred}$), firstly a two-times down-sampling is performed on $L_{rec}$; a splicing is performed through a concatenate layer; a convolution operation is performed by a convolution layer to extract a feature map, an intermediate value is outputted after processing by a residual layer (Resblock), the average pooling layer, a sampling conversion module and two convolution layers, etc; and one of the inputs (the prediction value $Cb_{pred}$ or $Cr_{pred}$ of the chroma component) and the intermediate value are added by the first adder 602 to output the $Cb_{pred}'$ or $Cr_{pred}'$. Herein, the convolution layer can be divided into a first convolution layer and a second convolution layer. The first convolution layer is Conv (3, 64, 1), i.e., the convolution kernel is 3*3, the number of channels is 64, and the step is 1. The second convolution layer is Conv (3, 1, 1), i.e., the convolution kernel is 3*3, the number of channels is 1, and the step is 1. In addition, the average pooling layer (Avg-pooling) has the down-sampling function, so the neural network model can also include a sampling conversion module. The sampling conversion module can be an up-sampling module (Up-sampling) or a down-sampling module (Under-sampling). In embodiments of the present disclosure, the sampling conversion module is generally the up-sampling module, such as the example of the neural network model 601 in FIG. 6.

Figure 7:
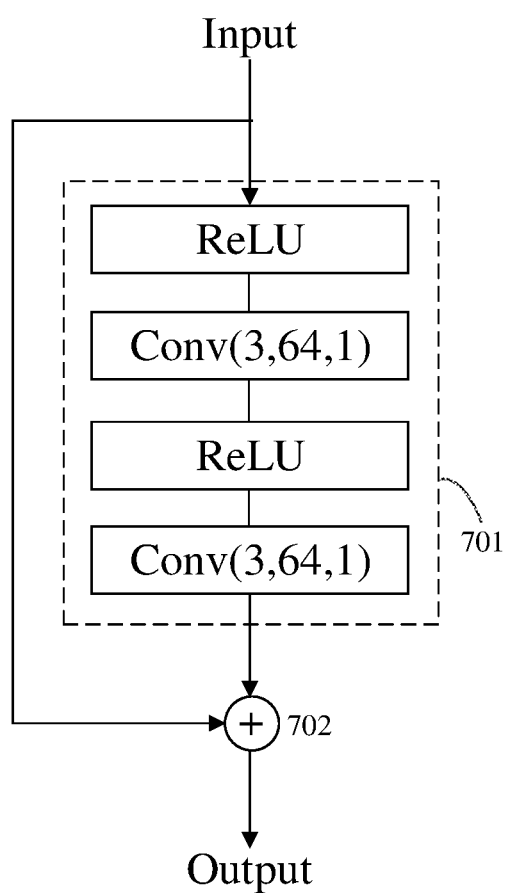
FIG. 7 is a schematic diagram of a network structure of a residual layer according to an embodiment of the present disclosure.

It is to be further noted that in FIG. 7, the residual layer may consist of a residual network 701 and a second adder 702. The residual network 701 may consist of an activation function represented by ReLU, and the convolution layer, which is the first convolution layer, i.e. Conv (3, 64, 1). Herein, the output obtained after the input of the residual layer passes through the residual network 701 and the input of the residual layer are added by the second adder 702 to obtain the output of the residual layer.

In addition, in the example of the network structure in FIG. 6, the neural network model 601 may include a total of 1 concatenate layer, 2 first convolution layers, 6 residual layers, 2 average pooling layers, 2 up-sampling modules, and 1 second convolution layer. It is to be noted that the network structure is not unique and may be any other stacking mode or any other network structure, which is not specifically limited in the embodiments of the present disclosure.

Figure 8:
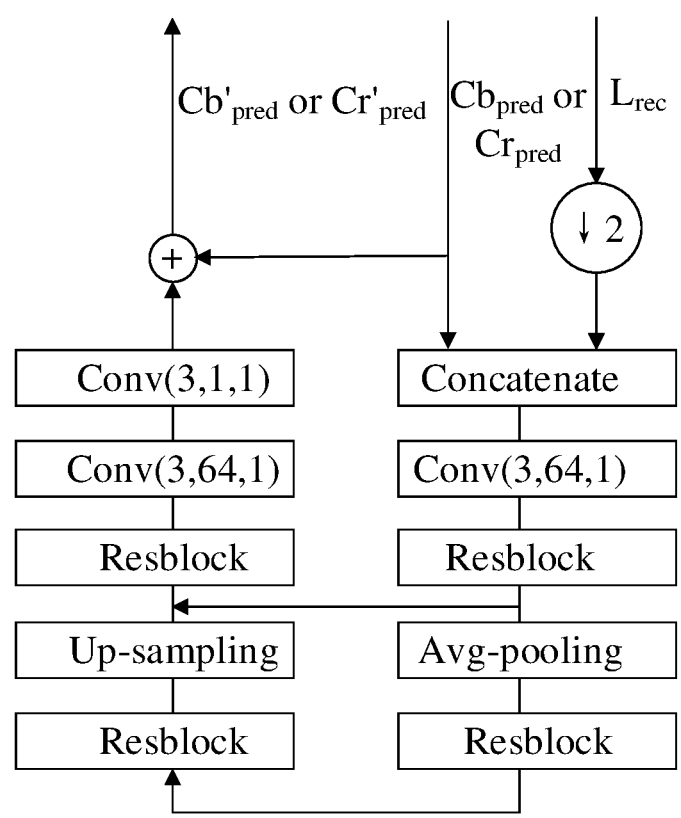
FIG. 8 is a schematic diagram of a network structure of another preset network model according to an embodiment of the present disclosure.
Figure 9:
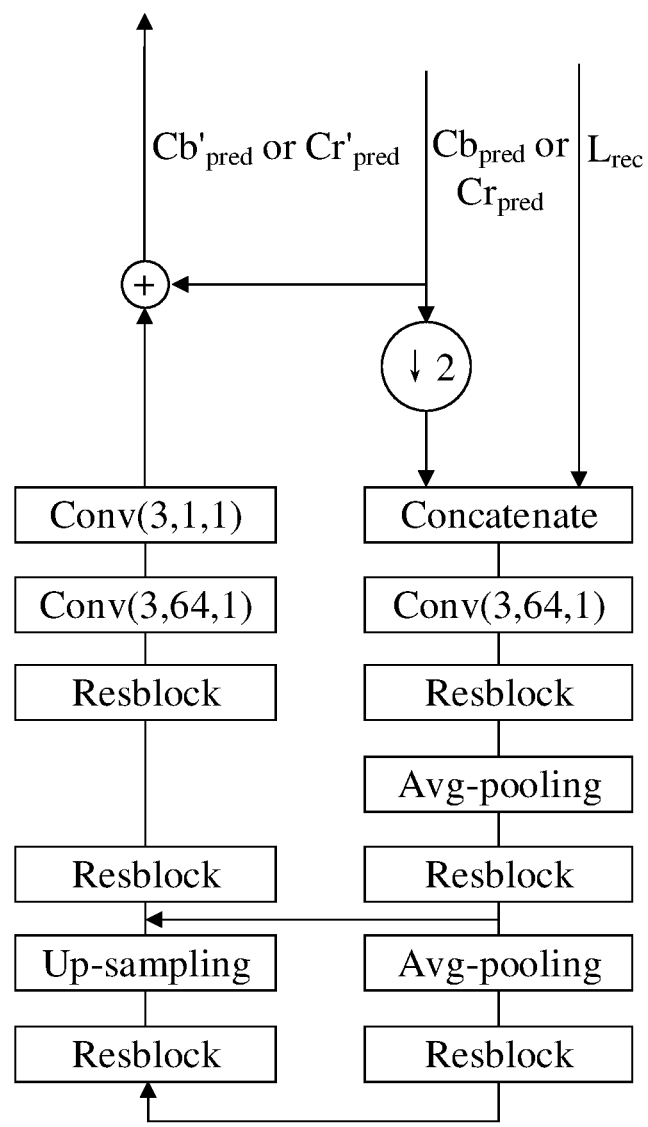
FIG. 9 is a schematic diagram of a network structure of yet another preset network model according to an embodiment of the present disclosure.
Figure 10:
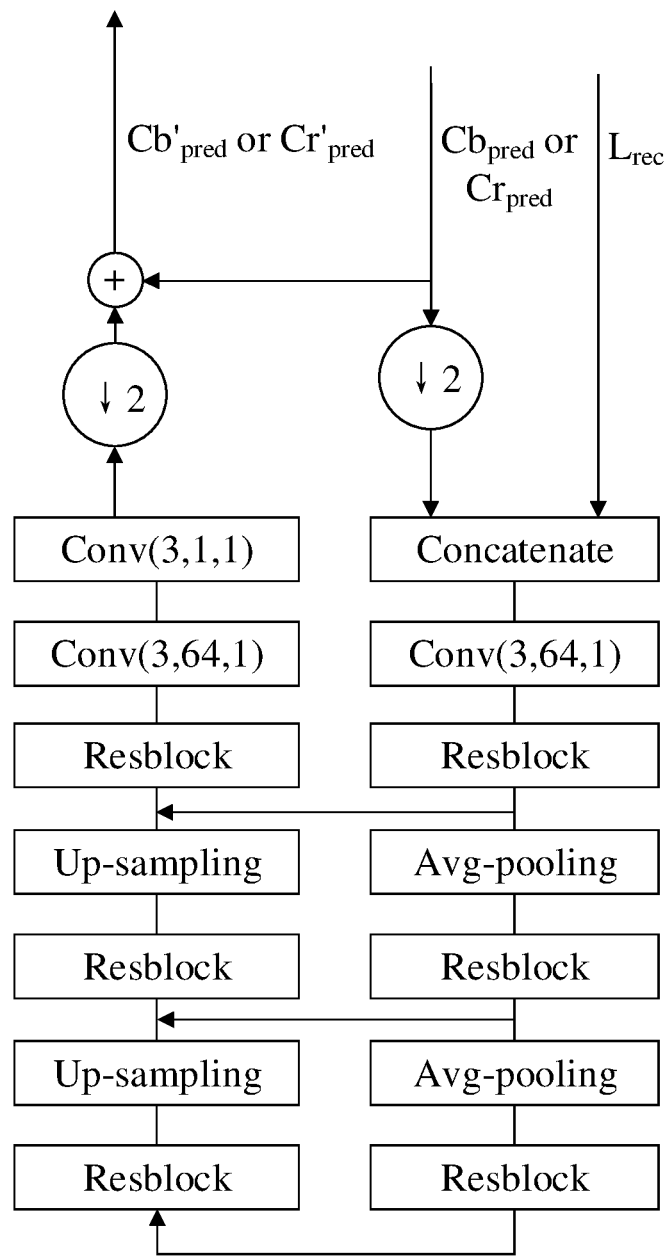
FIG. 10 is a schematic diagram of a network structure of still another preset network model according to an embodiment of the present disclosure.

With Reference to FIG. 8, a schematic diagram of a network structure of another preset network model according to an embodiment of the present disclosure is shown. With Reference to FIG. 9, a schematic diagram of a network structure of yet another preset network model according to an embodiment of the present disclosure is shown. With Reference to FIG. 10, a schematic diagram of a network structure of still another preset network model according to an embodiment of the present disclosure is shown. In FIG. 8, down-sampling is performed on the reconstructed value ($L_{rec}$) of the luma component to achieve the resolution of the reconstructed value ($L_{rec}$) of the luma component that is identical to the resolution of the prediction value ($Cb_{pred}$ or $Cr_{pred}$) of the chroma component. In FIG. 9 and FIG. 10, up-sampling is performed on the prediction value ($Cb_{pred}$ or $Cr_{pred}$) of the chroma component to achieve the resolution of the reconstructed value ($L_{rec}$) of the luma component that is identical to the resolution of the prediction value ($Cb_{pred}$ or $Cr_{pred}$) of the chroma component. In other words, FIG. 8 to FIG. 10 show three alternative examples of the network structure to illustrate that the network structure of the preset network model is not unique and may be any other stacked mode or any other network architecture.

Figure 11:
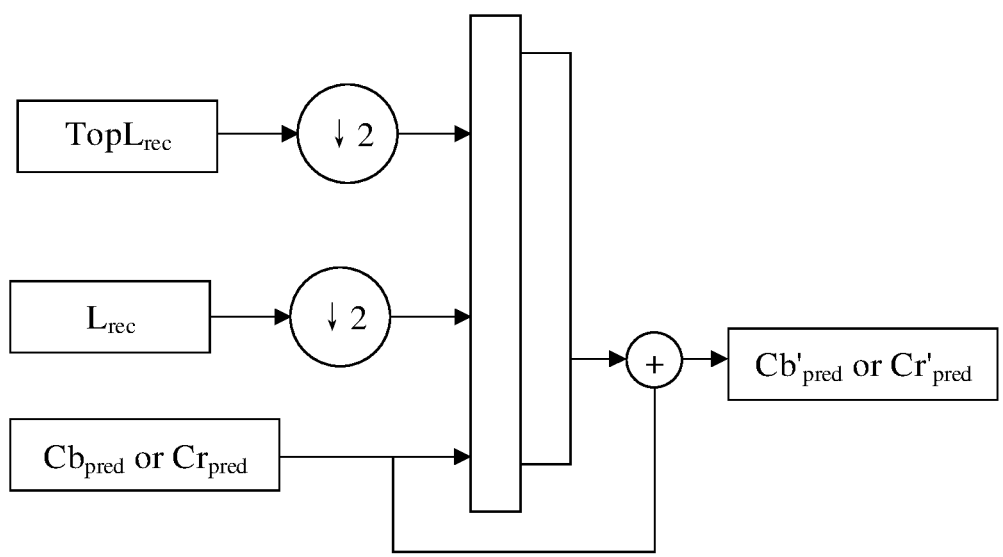
FIG. 11 is a schematic diagram of yet another application scenario of a picture prediction method according to an embodiment of the present disclosure.

(2) With Reference to FIG. 11, a schematic diagram of yet another application scenario of a picture prediction method according to an embodiment of the present disclosure is shown. In the application scenario, it is assumed that the to-be-predicted colour component is a chroma component (represented by Cb or Cr), and the side information of the current block is a reconstructed value (represented by $L_{rec}$) of the luma component of the current block and a reconstructed value (represented by $TopL_{rec}$) of a luma component of a top neighbouring block.

Figure 12:
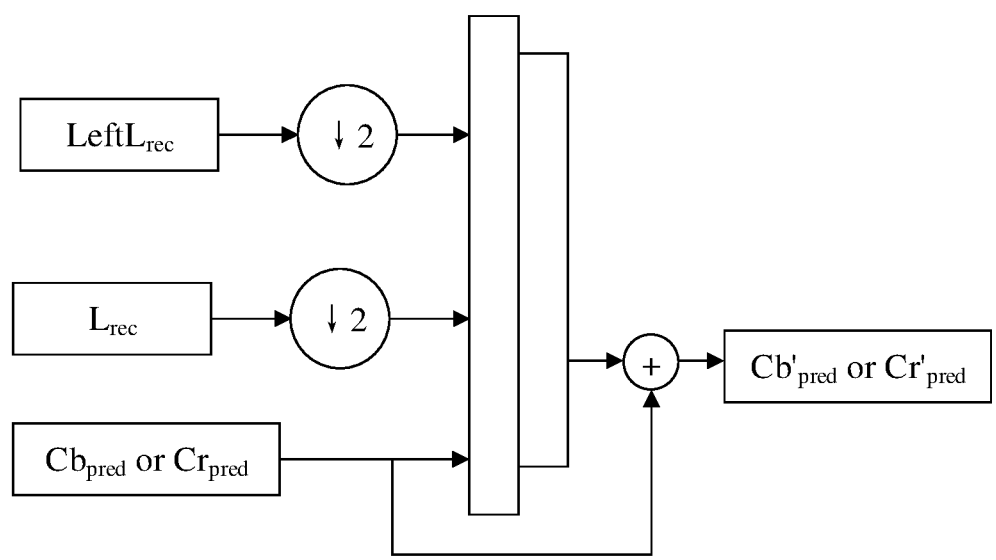
FIG. 12 is a schematic diagram of still another application scenario of a picture prediction method according to an embodiment of the present disclosure.

With Reference to FIG. 12, a schematic diagram of still another application scenario of a picture prediction method according to an embodiment of the present disclosure is shown. In the application scenario, it is assumed that the to-be-predicted colour component is a chroma component (represented by Cb or Cr), and the side information of the current block is the reconstructed value (represented by $L_{rec}$) of the luma component of the current block and a reconstructed value (represented by $LeftL_{rec}$) of a luma component of a left neighbouring block.

Figure 13:
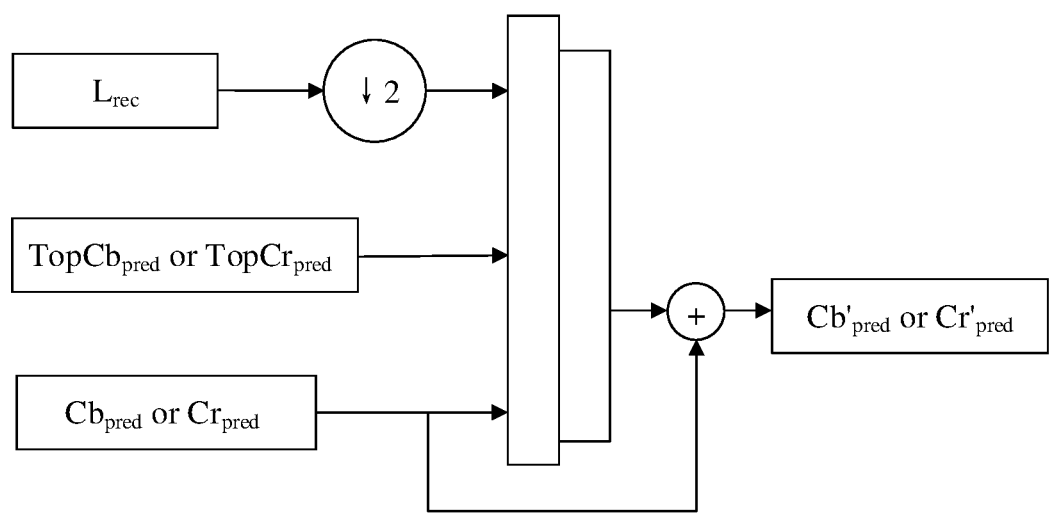
FIG. 13 is a schematic diagram of still another application scenario of a picture prediction method according to an embodiment of the present disclosure.

With Reference to FIG. 13, a schematic diagram of still another application scenario of a picture prediction method according to an embodiment of the present disclosure is shown. In the application scenario, it is assumed that the to-be-predicted colour component is the chroma component (represented by Cb or Cr), and the side information of the current block is the reconstructed value (represented by $L_{rec}$) of the luma component of the current block and a prediction value (represented by $TopCb_{pred}$ or $TopCr_{pred}$) of a chroma component of a top neighbouring block.

Figure 14:
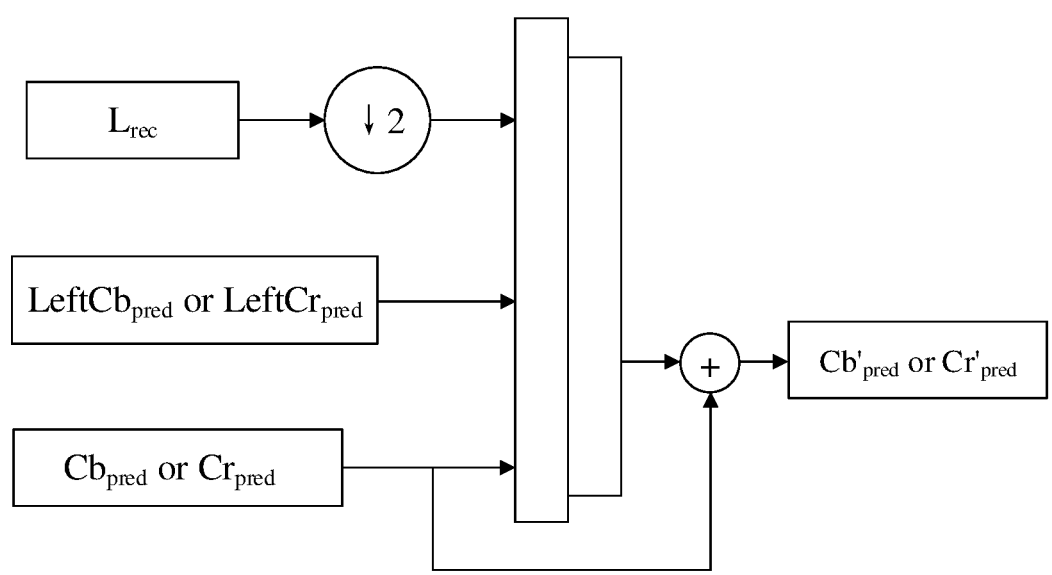
FIG. 14 is a schematic diagram of still another application scenario of a picture prediction method according to an embodiment of the present disclosure.

With Reference to FIG. 14, a schematic diagram of still another application scenario of a picture prediction method according to an embodiment of the present disclosure is shown. In the application scenario, it is assumed that the to-be-predicted colour component is a chroma component (represented by Cb or Cr), and the side information of the current block is the reconstructed value (represented by $L_{rec}$) of the luma component of the current block and a prediction value (represented by $LeftCb_{pred}$ or $LeftCr_{pred}$) of a chroma component of a left neighbouring block.

It is to be noted that the side information of the preset network model can be other side information. For blocks of the chroma component, the side information may be the luma component ($TopL_{rec}$) of the top neighbouring block of the current block and the luma component ($LeftL_{rec}$) the left neighbouring block of the current block, their respective chroma components ($TopCb_{pred}$ or $TopCr_{pred}$, $LeftCb_{pred}$ or $LeftCr_{pred}$), and the like, as shown in FIG. 11 to FIG. 14 in particular.

Figure 15:
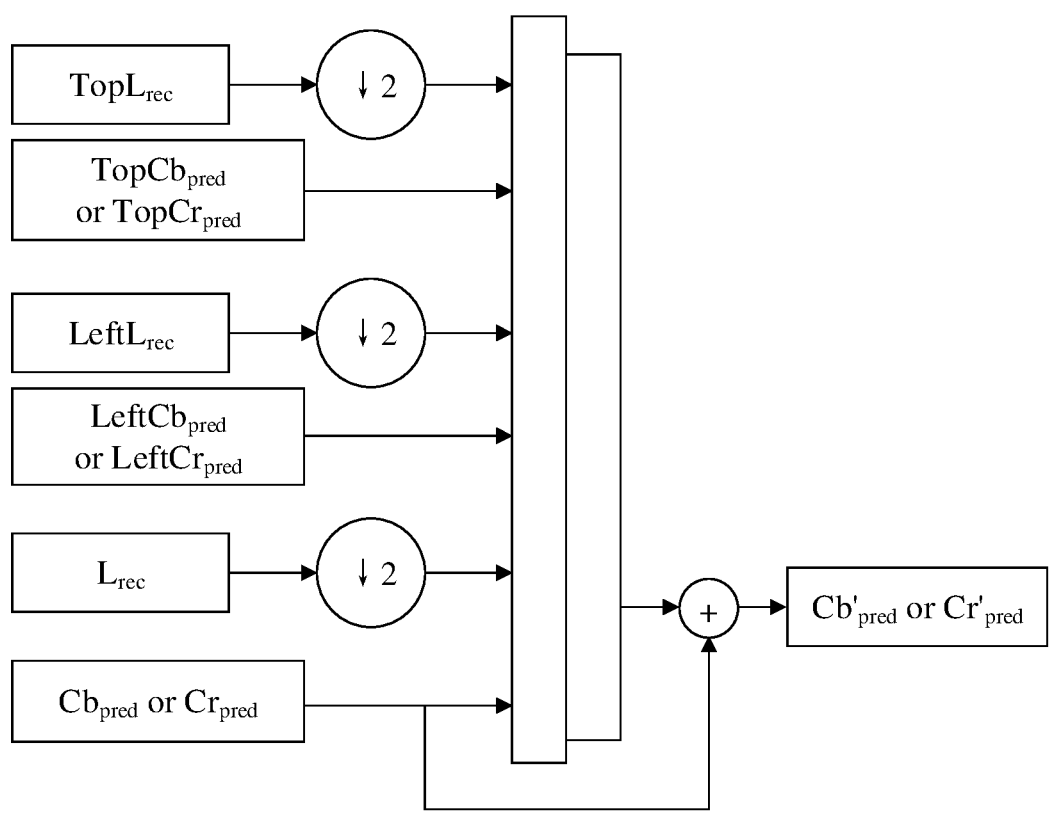
FIG. 15 is a schematic diagram of still another application scenario of a picture prediction method according to an embodiment of the present disclosure.

(3) With Reference to FIG. 15, a schematic diagram of still another application scenario of a picture prediction method according to an embodiment of the present disclosure is shown. In the application scenario, it is assumed that the to-be-predicted colour component is the chroma component (represented by Cb or Cr), and the side information of the current block is the reconstructed value (represented by $L_{rec}$) of the luma component of the current block, the reconstructed value (represented by $TopL_{rec}$) of the luma component of the top neighbouring block, the reconstructed value (represented by $LeftL_{rec}$) of the luma component of the left neighbouring block, the prediction value (represented by $TopCb_{pred}$ or $TopCr_{pred}$) of the chroma component of the top neighbouring block, and the prediction value (represented by $LeftCb_{pred}$ or $LeftCr_{pred}$) of the chroma component of the left neighbouring block.

In some embodiments, it is assumed that the side information of the current block includes at least two of: the reconstructed value of a reference colour component of the current block, the colour component value corresponding to at least one row of pixels adjacent to the current block, or the colour component value corresponding to at least one column of pixels adjacent to the current block.

Then, the operation of filtering the initial prediction value by using the preset network model and the side information of the current block, to obtain the target prediction value of the to-be-predicted colour component of the current block include the following two operations.

Combined side information is formed based on the at least two of the side information above.

The combined side information and the initial prediction value of the to-be-predicted colour component are inputted into the preset network model, and the target prediction value of the to-be-predicted colour component is outputted through the preset network model.

It is to be noted that the side information of the preset network model can be the combined side information. Even all of the side information above can be combined as input or a part of the side information above can be combined as input, as shown in FIG. 15.

Figure 16:
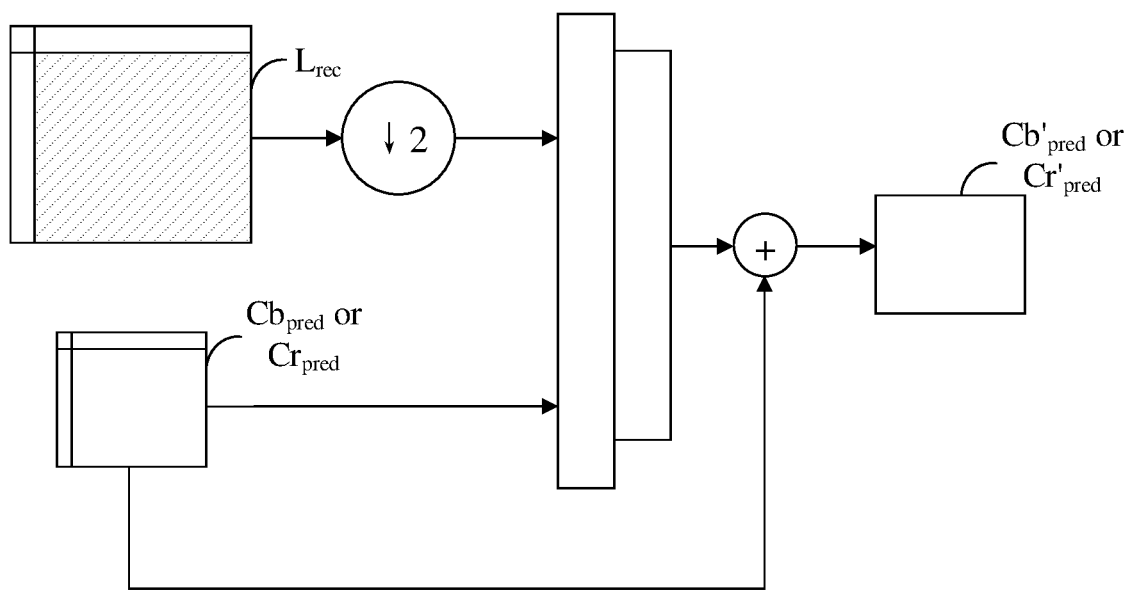
FIG. 16 is a schematic diagram of still another application scenario of a picture prediction method according to an embodiment of the present disclosure.

(4) With Reference to FIG. 16, a schematic diagram of still another application scenario of a picture prediction method according to an embodiment of the present disclosure is shown. As shown in FIG. 16, after the initial prediction value of the chroma component of the current block is obtained, the top neighbouring and left neighbouring two rows/columns (or multiple rows/columns) of the current luma block are spliced with the current luma block (filled with the slash lines), and two-times down-sampling is performed thereon; the top neighbouring and left neighbouring row/column (or rows/columns) of the current chroma block are spliced with the current chroma block (filled with the grid lines); and both items resulted from two preceding steps are used as inputs of the preset network model. Furthermore, the current chroma block is connected to the output of the preset network model, and finally the target prediction value ($Cb_{pred}'$ or $Cr_{pred}'$) of chroma component subjected to the filtering enhancement is obtained.

Furthermore, in some embodiments, the combined side information includes a reference value of the to-be-predicted colour component corresponding to at least one top neighbouring row of reference pixels of the current block and a reference value of the to-be-predicted colour component corresponding to at least one left neighbouring column of reference pixels of the current block. The method further includes the following operation.

The reference value of the to-be-predicted colour component corresponding to the at least one top neighbouring row of reference pixels of the current block, the reference value of the to-be-predicted colour component corresponding to the at least one left neighbouring column of reference pixels of the current block, and the initial prediction value of the to-be-predicted colour component of the current block are inputted into the preset network model, and the target prediction value of the to-be-predicted colour component of the current block is outputted through the preset network model.

Figure 17:
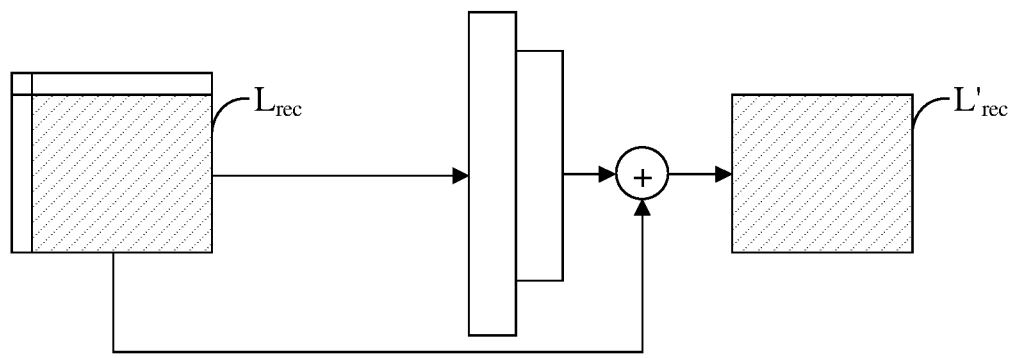
FIG. 17 is a schematic diagram of still another application scenario of a picture prediction method according to an embodiment of the present disclosure.

That is to say, as shown in FIG. 17, after the initial prediction value ($L_{pred}$) of the luma component is obtained, the top neighbouring and left neighbouring two (or multiple) rows/columns of the current luma block can be spliced with the current luma block (filled with slash lines) as an input of the preset network model. Furthermore, the current luma block is connected to the output of the preset network model, and finally the target prediction value ($L_{pred}'$) of the luma component subjected to the filtering enhancement is obtained.

In addition, in the embodiments of the present disclosure, before or after the loop filtering, the network with skip connections for local input data (i.e., the preset network model) proposed in the embodiments of the present disclosure can also be used to enhance the reconstructed data. Alternatively, in other network frameworks for lossy or lossless compression coding, after the prediction information is obtained, the network with skip connections for local input data proposed by the embodiments of the present disclosure can also be added, and other side information can be used as input of the network, so as to improve the accuracy of prediction information. Alternatively, in other network frameworks for lossy or lossless compression coding, the preset network model described above can also be used for filtering enhancement. It is to be further noted that the accuracy of the prediction value can also be improved in the above manner with respect to the initial prediction value obtained by encoding other luma components or chroma components in video coding.

In short, in the embodiments of the present disclosure, the deep learning network with skip connections for local input data is used to enhance the accuracy of the prediction value in video coding, thereby improving coding efficiency. In one aspect, both to-be-enhanced data (such as the initial prediction value of the chroma component in the above embodiments) and side information (such as the reconstructed value of the luma component of the current block in the above embodiments) are taken as the inputs, and the to-be-enhanced data is enhanced by using the high correlation between the to-be-enhanced data and side information (such as chroma component and luma component), thereby improving the overall encoding and decoding performance. On the other hand, a part of the inputs of the preset network model, i.e., the to-be-enhanced the data (such as the initial prediction value of the chroma component), is connected to the output of the preset network model simultaneously, which facilitate the training of the network model. In this way, the prediction data can be enhanced by using the network with skip connections for local input data and by using the correlation between data. For example, by using the high correlation between the chroma component and the luma component, the initial prediction value of the chroma component is enhanced by the neural network to effectively improve the prediction accuracy for chroma component, and then improve the coding efficiency. Moreover, the network with skip connections for local input data is easy to be trained and applied to computation in actual scenes.

The embodiments provide a picture prediction method, the implementation of the foregoing embodiments is specifically described by the foregoing embodiments. It can be seen that, by utilizing the correlation between colour components, predication enhancement can be implemented on the initial prediction value according to the side information of the current block and the preset network model, which can make the enhanced target prediction value closer to the true value, thus effectively improving the prediction accuracy, improving the encoding and decoding efficiency and improving the overall encoding and decoding performance.

In yet another embodiment of the present disclosure, the picture prediction method provided by the embodiments of the present disclosure is applied to a video coding device, i.e. a decoder. The function implemented by the method can be implemented by calling computer programs by a second processor in the decoder. Of course, the computer programs can be stored in a second memory. It can be seen that the decoder includes at least the second processor and the second memory.

Figure 18:
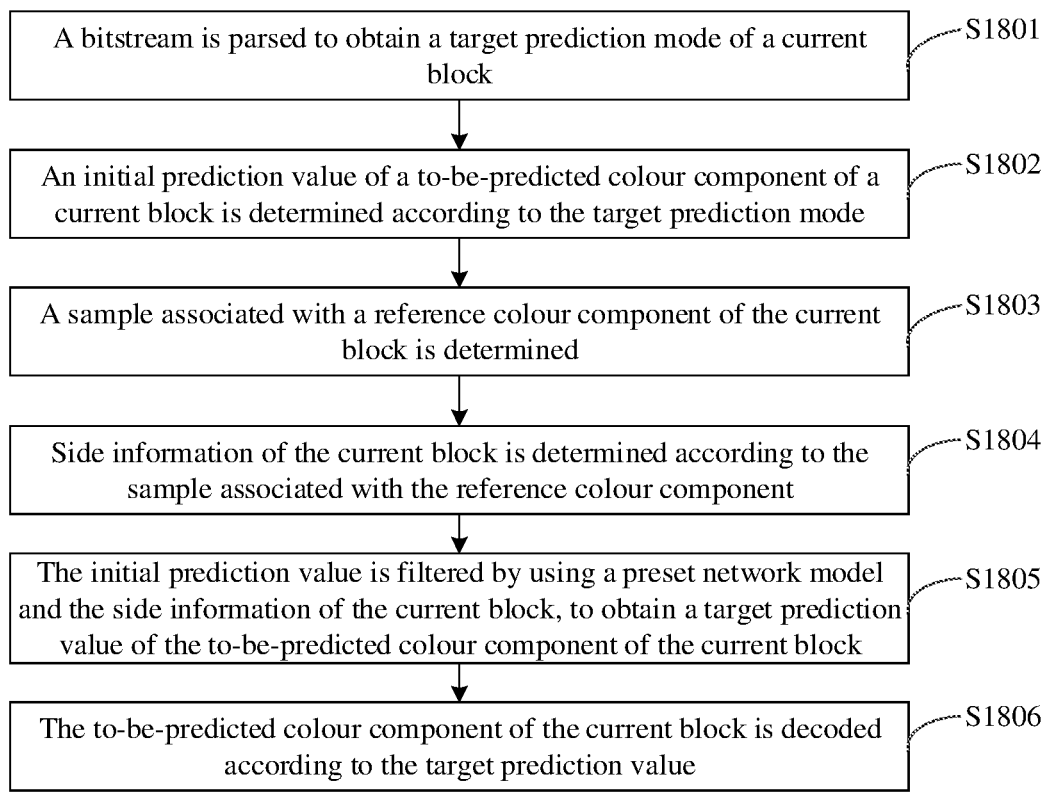
FIG. 18 is a flowchart of another picture prediction method according to an embodiment of the present disclosure.

Based on the above application scenario example of FIG. 2B. with reference to FIG. 18, a flowchart of another picture prediction method according to an embodiment of the present disclosure is shown. As shown in FIG. 18, the method includes operations S1801 to S1806.

In operation S1801, a bitstream is parsed to acquire a target prediction mode of a current block.

It is to be noted that the video picture can be divided into multiple picture blocks, and each picture block to be encoded can be referred to as a CB. Herein, each coding block may include a first colour component, a second colour component and a third colour component. The current block is a coding block whose first colour component, the second colour component or the third colour component is currently to be predicted in the video picture.

It is assumed that prediction is performed on the first colour component of the current block, and the first colour component is a luma component, i.e. the to-be-predicted colour component is a luma component, then the current block can also be referred to as a luma block. Alternatively, it is assumed that the prediction is performed on the second colour component of the current block, and the second colour component is a chroma component, i.e. the to-be-predicted colour component is a chroma component, the current block may also be referred to as a chroma block.

It is to be further noted that after the encoder determines the target prediction mode, the encoder will signal the target prediction mode. In this way, the decoder can obtain the target prediction mode of the current block by parsing the bitstream. The target prediction mode may be an intra prediction mode or an inter prediction mode. Furthermore, the target prediction mode may be a prediction mode within a same colour component or a prediction mode between different colour components. In general, inter-component prediction mode usually is the prediction mode between different colour components, such as CCLM mode.

In operation, an initial prediction value of a to-be-predicted colour component of a current block is determined according to the target prediction mode.

It is to be noted that the target prediction mode is used for indicating the prediction mode used for coding prediction of the current block. In some embodiments, the operation of determining the initial prediction value of the to-be-predicted colour component of the current block according to the target prediction mode may include the following operation.

The to-be-predicted colour component of the current block is predicted according to the target prediction mode, to obtain the initial prediction value of the to-be-predicted colour component of the current block.

That is to say, after the target prediction mode is obtained, the to-be-predicted colour component of the current block can be predicted according to the target prediction mode, and the initial prediction value of the to-be-predicted colour component of the current block can be obtained.

In operation S1803, a sample associated with a reference colour component of the current block is determined.

It is to be noted that the reference colour component includes one or more colour components in a current picture that are different from the to-be-predicted colour component. The current picture is a picture where the current block is located.

In some embodiments, the operation of determining the sample associated with the reference colour component of the current block may include the following operation.

The sample associated with the reference colour component is determined according to at least one of: a prediction value of the reference colour component of the current block, or a reconstructed value of the reference colour component of the current block.

Furthermore, in some embodiments, the operation of determining the sample associated with the reference colour component of the current block may include the following operation.

The sample associated with the reference colour component is determined according to at least one of: a prediction value of the reference colour component corresponding to a pixel adjacent to the current block, or a reconstructed value of the reference colour component corresponding to the pixel adjacent to the current block.

It is to be further noted that the pixel adjacent to the current block includes at least one row of pixels adjacent to the current block. Alternatively, the pixel adjacent to the current block includes at least one column of pixels adjacent to the current block.

In an embodiment of that present disclosure, the sample associated with the reference colour component of the current block includes at least two of: the reconstructed value of the reference colour component of the current block, a reference colour component value corresponding to at least one row of pixels adjacent to the current block, or a reference colour component value corresponding to at least one column of pixels adjacent to the current block. The reference colour component of the current block is different from the to-be-predicted colour component.

Additionally for the inter prediction mode, the reference colour component may include one or more colour components of the reference picture. The reference picture is different from the current picture where the current block is located.

In some embodiments, the operation of determining the sample associated with the reference colour component of the current block includes the following operation.

The sample associated with the reference colour component is determined according to reconstructed values of one or more colour components in a prediction reference block of the current block.

Furthermore, in some embodiments, in some embodiments, the method may further include the following three operations.

In response to the target prediction mode being the inter prediction mode, the bitstream is parsed to acquire an inter prediction mode parameter of the current block, where the inter prediction mode parameter includes a reference picture index and a motion vector.

The reference picture is determined according to the reference picture index.

The prediction reference block in the reference picture is determined according to the motion vector.

It is to be noted that for the inter prediction mode, a reference picture is needed besides the current picture where the current block is located. The reference picture index is the picture index number of the reference picture, and the motion vector is used for indicating the prediction reference block in the reference picture. Herein, the encoder may take the reference picture index and the motion vector as the inter prediction mode parameters and signal the reference picture index and the motion vector for transmission to the decoder from the encoder. In this way, the decoder can directly obtain the reference picture index and motion vector by parsing the bit-stream.

Thus, after the sample associated with the reference colour component of the current block is determined, the side information of the current block can be determined according to the sample associated with the reference colour component.

In operation S1804, side information of the current block is determined according to the sample associated with the reference colour component.

It is to be noted that in the embodiment of the present disclosure, the technical key of the present disclosure is to perform enhancement filtering on the initial prediction value of one colour component by using relevant parameters of another colour component. Herein, the relevant parameters of "another colour component" are mainly the side information of the current block. On the one hand, the sample associated with the reference colour component can be determined as the side information of the current block. On the other hand, the sample associated with the reference colour component may be filtered such as up-sampling/down-sampling, and the filtered sample can be determined as the side information of the current block, which is not limited in the embodiments of the present disclosure.

That is to say, in a possible implementation, the operation of determining the side information of the current block according to the sample associated with the reference colour component may include determining the sample associated with the reference colour component as the side information of the current block.

In another possible implementation, the operation of determining the side information of the current block according to the sample associated with the reference colour component includes performing a first filtering processing on the sample associated with the reference colour component according to a colour component sampling format, to obtain a filtered sample associated with the reference colour component; and determining the filtered sample associated with the reference colour component as the side information of the current block.

It is to be noted that the colour component may include a luma component, a blue chroma component, and a red chroma component. The colour component sampling format may have a 4:4:4 format, a 4:2:2 format and a 4:2:0 format. Herein, the 4:2:2 format and the 4:2:0 format are suitable for the above-mentioned first filtering processing, while the 4:4:4 format is not suitable for the above-mentioned first filtering processing.

Furthermore, in some embodiments, the method may further include the following operation.

The bitstream is parsed to acquire the colour component sampling format.

Alternatively, in some embodiments, the method may further include the following two operations.

A data unit of a parameter set in the bitstream is parsed to acquire a value of a bit field for indicating the colour component sampling format.

The colour component sampling format is determined according to the value of the bit field.

That is, after the encoder determines the colour component sampling format, the colour component sampling format is signalled, or, a value of a bit field indicating a colour component sampling format is determined, and is signalled. Then the bitstream is transmitted to the decoder from the encoder, so that the decoder can directly obtain the colour component sampling format after the bitstream is parsed.

It is to be further noted that since the resolution of the luma component is different from the resolution of the chroma component (such as the blue chroma component or the red chroma component), a first filtering process, such as an up-sampling processing or down-sampling processing, is performed on the sample associated with the reference colour component according to the specific requirement. Specifically, in some embodiments, the operation of performing the first filtering processing on the sample associated with the reference colour component may include the following three operations.

In response to a resolution of the initial prediction value being smaller than a resolution of the sample associated with the reference colour component, the sample associated with the reference colour component is down-sampled.

In response to the resolution of the initial prediction value being greater than the resolution of the sample associated with the reference colour component, the sample associated with the reference colour component is up-sampled.

In response to the resolution of the initial prediction value being equal to the resolution of the sample associated with the reference colour component, the filtered sample associated with the reference colour component is set to be equal to the sample associated with the reference colour component.

In an embodiment of the present disclosure, the resolution of the filtered sample associated with the reference colour component is equal to a resolution of the initial prediction value.

Exemplarily, if the to-be-predicted colour component is a chroma component and the reference colour component is a luma component, then the sample associated with the reference colour component need to be down-sampled, and the resolution of the luma component subjected to the down-sampling processing is identical to that of the resolution of the chroma component. Alternatively, if the to-be-predicted colour component is the luma component and the reference colour component is a chroma component, sample associated with the reference colour component need to be up-sampled, and the resolution of the chroma component subjected to the up-sampling processing is identical to the resolution of the luma component. In addition, if the to-be-predicted colour component is the blue chroma component and the reference colour component is the red chroma component, then, since the resolution of the blue chroma component is identical to the resolution of the red chroma component, the first filtering processing is not required for the sample associated with the reference colour component at this time, i.e., the filtered sample associated with the reference colour component can be set to be equal to the sample associated with the reference colour component before filtering.

In this way, after the sample associated with the reference colour component is determined, side information of the current block can be determined according to the sample associated with the reference colour component, so as to perform the filtering enhancement on the initial prediction value of the to-be-predicted colour component by using the side information of the current block.

In operation S1805, the initial prediction value is filtered by using a preset network model and the side information of the current block, to obtain a target prediction value of the to-be-predicted colour component of the current block.

It is to be noted that a preset network model is used in the embodiments of the present disclosure, the preset network model can be referred to as a network model with skip connections for local data or a semi-residual network, and then the filtering enhancement is performed on the initial prediction value in combination with the side information of the current block to improve the prediction accuracy.

For the preset network model, before the operation S1805, the method may further include determining the preset network model.

In the embodiments of the present disclosure, the preset network model is obtained through model training. In some embodiments, the operation of determining the preset network model may specifically the following three operations.

A training sample set is acquired, where the training sample set includes one or more pictures.

An initial network model is constructed, and the initial network model is trained by using the training sample set.

A trained initial network model is determined as the preset network model.

It is to be noted that the training sample set may include one or more pictures. The training sample set may be a training sample set stored locally by an encoder, a training sample set is acquired from a remote server according to link or address information, or even a set of decoded picture samples in a video, which is not specifically limited in the embodiment of the present disclosure.

In this way, after the training sample set is acquired, the initial network model can be trained by using the training sample set through the cost function. When the Loss of the cost function converges to a certain preset threshold, the trained initial network model is the preset network model. Herein, the cost function may be a rate-distortion cost function and the preset threshold may be specifically set according to the actual situation, which is not limited in the embodiments of the present disclosure.

In addition, when the preset network model is determined, the network model parameters of the preset network model can be determined first. In some embodiments, the operation of determining the preset network model may include the following two operations.

The network model parameters are determined.

The preset network model is constructed according to the determined network model parameters.

In embodiments of the present disclosure, the network model parameters may be determined through model training. Specifically, in some embodiments, the operation of determining the preset network model may include acquiring a training sample set; and constructing an initial network model. The initial network model includes model parameters. The initial network model is trained by using the training sample set, and the model parameters of the trained initial network model are determined as the network model parameters.

In another possible implementation, the operation of determining the preset network model may include the following two operations.

The bitstream is parsed to acquire network model parameters of the preset network model.

The preset network model is determined according to determined network model parameters.

At this time, the encoder obtains the network model parameters through model training, the network model parameters are signalled. In this way, the decoder side can directly obtain the network model parameters by parsing the bitstream, and the preset network model can be constructed without model training at the decoder side.

In some embodiments, the preset network model may include the neural network model and the first adder.

It is to be noted that the neural network model can at least include a convolution layer, a residual layer, an average pooling layer, or a sampling conversion module. Herein, the residual layer may be composed of an activation function, a convolution layer and a second adder. The sampling conversion module can be an up-sampling module or a down-sampling module. In the neural network model provided in the embodiments of the present disclosure, the average pooling layer and the sampling conversion module have a function equivalent to the effect of low-pass filtering, and the sampling conversion module generally is the up-sampling module, which is not specifically limited in the embodiment of the present disclosure.

Furthermore, in some embodiments, the operation of filtering the initial prediction value by using the preset network model and the side information of the current block, to obtain the target prediction value of the to-be-predicted colour component of the current block may include the following operation.

The side information of the current block and the initial prediction value of the to-be-predicted colour component are inputted into the preset network model to output the target prediction value of the to-be-predicted colour component by the preset network model.

It is to be noted that, since the preset network model may include the neural network model and the first adder, the operation of inputting the side information of the current block and the initial prediction value of the to-be-predicted colour component into the preset network model to output the target prediction value of the to-be-predicted colour component by the preset network model may specifically include: the side information and the initial prediction value are inputted into the neural network model to output an intermediate value; and addition processing is performed on the intermediate value and the initial prediction value by the first adder to obtain the target prediction value.

In operation S1806, the to-be-predicted colour component of the current block is decoded according to the target prediction value.

It is to be noted that after the target prediction value of the to-be-predicted colour component is obtained, the to-be-predicted colour component of the current block can be decoded. Specifically, after the target prediction value is obtained, the residual value is obtained by parsing the bit-stream, and then the real picture information can be decoded and recovered by using the residual value and the target prediction value.

The embodiments provide a picture prediction method applied to a decoder. The target prediction mode of the current block is acquired by parsing the bitstream; an initial prediction value of a to-be-predicted colour component of a current block is determined according to the target prediction mode; a sample associated with a reference colour component of the current block is determined; side information of the current block is determined according to the sample associated with the reference colour component; the initial prediction value is filtered by using a preset network model and the side information of the current block, to obtain a target prediction value of the to-be-predicted colour component of the current block; and the to-be-predicted colour component of the current block is decoded according to the target prediction value. In this way, the correlation between colour components can be used for prediction enhancement on the initial prediction value according to the side information of the current block and the preset network model, so that the enhanced target prediction value is closer to the true value, thereby effectively improving the prediction accuracy, improving the encoding and decoding efficiency and improving the overall encoding and decoding performance.

Figure 19:
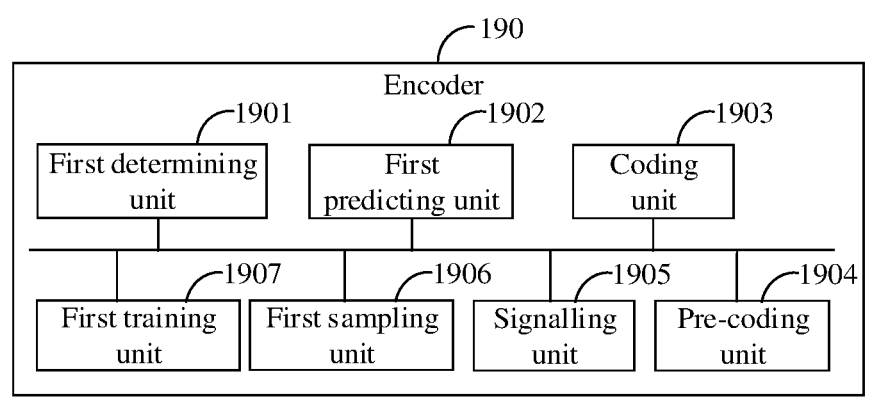
FIG. 19 is a schematic structural diagram of an encoder according to an embodiment of the present disclosure.

Based on the same inventive concept of the foregoing embodiments, with reference to FIG. 19, a schematic structural diagram of an encoder according to an embodiment of the present disclosure is shown. As shown in FIG. 190, the encoder 190 may include a first determining unit 1901, a first predicting unit 1902 and a coding unit 1903.

The first determining unit 1901 is configured to determine an initial prediction value of a to-be-predicted colour component of a current block.

The first determining unit 1901 is further configured to determine a sample associated with a reference colour component of the current block, and determine side information of the current block according to the sample associated with the reference colour component.

The first predicting unit 1902 is configured to filter the initial prediction value by using a preset network model and the side information of the current block, to obtain a target prediction value of the to-be-predicted colour component of the current block.

The coding unit 1903 is configured to encode the to-be-predicted colour component of the current block according to the target prediction value.

In some embodiments, the first predicting unit 1901 is further configured to determine a target prediction mode of the current block; and predict the to-be-predicted colour component of the current block according to the target prediction mode, to determine the initial prediction value of the to-be-predicted colour component of the current block.

In some embodiments, with reference to FIG. 19, the encoder 190 may also include a pre-coding unit 1904.

A first determining unit 1901 is further configured to determine the to-be-predicted colour component of the current block.

The pre-coding unit 1904 is configured to pre-code the to-be-predicted colour component by using one or more candidate prediction modes respectively, and determining a rate-distortion cost result corresponding to each of the candidate prediction modes.

The first determining unit 1901 is further configured to select an optimal rate-distortion cost result from the rate-distortion cost results, and determining a candidate prediction mode corresponding to the optimal rate-distortion cost result as the target prediction mode of the current block.

In some embodiments, the target prediction mode is an intra prediction mode or an inter prediction mode.

In some embodiments, the target prediction mode is a prediction mode within a same colour component or a prediction mode between different colour components.

In some embodiments, the reference colour component includes one or more colour components in a current picture that are different from the to-be-predicted colour component, the current picture being a picture where the current block is located.

In some embodiments, a first determining unit 1901 is specifically configured to determine the sample associated with the reference colour component according to at least one of: a prediction value of the reference colour component of the current block, or a reconstructed value of the reference colour component of the current block.

In some embodiments, a first determining unit 1901 is specifically configured to determine the sample associated with the reference colour component according to at least one of: a prediction value of the reference colour component corresponding to a pixel adjacent to the current block, or a reconstructed value of the reference colour component corresponding to the pixel adjacent to the current block.

In some embodiments, the pixel adjacent to the current block includes at least one row of pixels adjacent to the current block.

In some embodiments, the pixel adjacent to the current block includes at least one column of pixels adjacent to the current block.

In some embodiments, the reference colour component includes one or more colour components in a reference picture, where the reference picture is different from a current picture where the current block is located.

In some embodiments, the first determining unit 1901 is specifically configured to determine the sample associated with the reference colour component according to reconstructed values of one or more colour components in a prediction reference block of the current block.

In some embodiments, with reference to FIG. 19, the encoder 190 may also include a signalling unit 1905.

A first determining unit 1901 is further configured to determine an inter prediction mode parameter of the current block in response to the target prediction mode being the inter prediction mode, where the inter prediction mode parameter includes a reference picture index indicating the reference picture and a motion vector indicating the prediction reference block in the reference picture.

The signalling unit 1905 is configured to signal a determined inter prediction mode parameter.

In some embodiments, a first determining unit 1901 is further configured to determine the sample associated with the reference colour component as the side information of the current block.

In some embodiments, with reference to FIG. 19, the encoder 190 may further include a first sampling unit 1906 configured to perform a first filtering processing on the sample associated with the reference colour component according to a colour component sampling format, to obtain a filtered sample associated with the reference colour component; and determine the filtered sample associated with the reference colour component as the side information of the current block.

In some embodiments, the signalling unit 1905 is further configured to signal the colour component sampling format.

In some embodiments, the first determining unit 1901 is further configured to determine a value of a bit field to be signalled, where the value of the bit field is used for indicating the colour component sampling format.

The signalling unit 1905 is further configured to signal the value of the bit field.

In some embodiments, the first sampling unit 1906 is specifically configured to down-sampling the sample associated with the reference colour component in response to a resolution of the initial prediction value being smaller than a resolution of the sample associated with the reference colour component; p-sampling the sample associated with the reference colour component in response to the resolution of the initial prediction value being greater than the resolution of the sample associated with the reference colour component; and setting the filtered sample associated with the reference colour component to be equal to the sample associated with the reference colour component in response to the resolution of the initial prediction value being equal to the resolution of the sample associated with the reference colour component.

In some embodiments, a resolution of the filtered sample associated with the reference colour component is equal to a resolution of the initial prediction value.

In some embodiments, the sample associated with the reference colour component of the current block includes at least two of: the reconstructed value of the reference colour component of the current block, a reference colour component value corresponding to at least one row of pixels adjacent to the current block, or a reference colour component value corresponding to at least one column of pixels adjacent to the current block, where the reference colour component of the current block is different from the to-be-predicted colour component.

In some embodiments, a first predicting unit 1902 is specifically configured to input the side information of the current block and the initial prediction value of the to-be-predicted colour component into the preset network model to output the target prediction value of the to-be-predicted colour component by the preset network model.

In some embodiments, a first determining unit 1901 is further configured to determine the preset network model.

In some embodiments, the preset network model includes a neural network model and a first adder.

In some embodiments a first predicting unit 1902 is specifically configured to input the side information and the initial prediction value into the neural network model to output an intermediate value; and perform addition processing on the intermediate value and the initial prediction value by the first adder to obtain the target prediction value.

In some embodiments, the neural network model includes at least one of: a convolution layer, a residual layer, an average pooling layer, or a sampling conversion module.

In some embodiments, the residual layer includes at least one of: an activation function, a convolution layer, or a second adder.

In some embodiments, with reference to FIG. 19, the encoder 190 may further include a first training unit 1907 configured to: acquire a training sample set, where the training sample set includes one or more pictures; construct an initial network model, and train the initial network model by using the training sample set; and determine a trained initial network model as the preset network model.

In some embodiments the first determining unit 1901 is further configured to determine network model parameters; and construct the preset network model according to determined network model parameters.

It will be understood that in the embodiments of the present disclosure, a "unit" may be a part of a circuit, a part of a processor, a part of programs or software, etc., of course it may also be a module, or it may be non-modular. Moreover, each component in the embodiments of the present disclosure may be integrated in one processing unit, each unit may exist physically alone, or two or more units may be integrated in one unit. The integrated unit can be implemented either in the form of hardware or in the form of software function module.

If the integrated unit is implemented in the form of software functional modules and sold or used as an independent product, it can be stored in a computer readable storage medium. Based on such understanding, the technical solution of the present disclosure, the technical scheme of the embodiment of the present application can be embodied in the form of software products in essence or the part that contributes to the prior art. The computer software product is stored in a storage medium, includes several instructions for making a computer device (which can be a personal computer, a server, a network device, etc.) or a processor to perform all or part of the steps of the method according to each embodiment of the present disclosure. The aforementioned storage media include: a U disk, a removable hard disk, a Read Only Memory (ROM), a Random Access Memory (RAM), a disk or an optical disk and other media that can store program codes.

Thus, embodiments of the present disclosure provide a computer storage medium, applied to the encoder 190, when executed by a first processor, cause the first processor to perform the method of any of the preceding embodiments.

Figure 20:
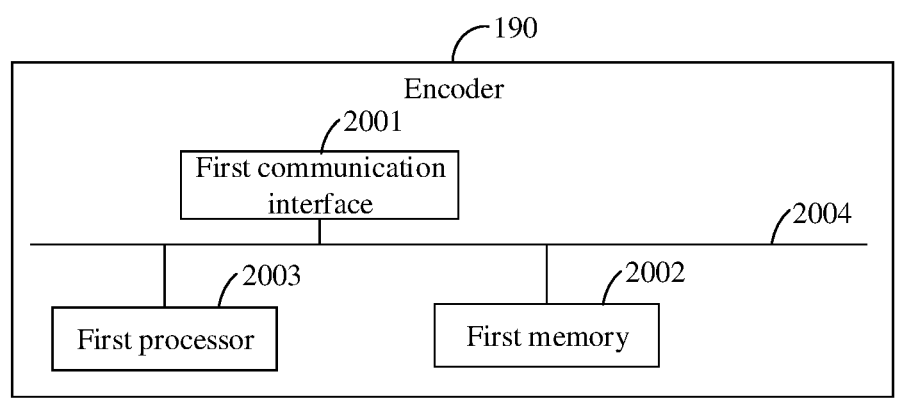
FIG. 20 is a schematic diagram of a specific hardware structure of an encoder according to an embodiment of the disclosure.

Based on the composition of the encoder 190 and the computer storage medium described above, with reference to FIG. 20, a schematic diagram of a specific hardware structure of an encoder 190 according to an embodiment of the disclosure is shown. As shown in FIG. 20, encoder 190 may include a first communication interface 2001, a first memory 2002 and a first processor 2003. The components are coupled together by a first bus system 2004. It can be appreciated that the first bus system 2004 is configured to implement connection communication between these components. The first bus system 2004 includes a power bus, a control bus and a status signal bus in addition to a data bus. However, for the sake of clarity, the various buses are designated in FIG. 20 as the first bus system 2004.

The first communication interface 2001 is configured to receive and send signals in the process of sending and receiving information with other external network elements.

The first memory 2002 is configured to store computer programs capable of running on the first processor 2003.

The first processor 2003 is configured to run the computer programs to perform the following five operations.

An initial prediction value of a to-be-predicted colour component of a current block is determined.

A sample associated with a reference colour component of the current block is determined.

Side information of the current block is determined according to the sample associated with the reference colour component.

The initial prediction value is filtered by using a preset network model and the side information of the current block, to obtain a target prediction value of the to-be-predicted colour component of the current block.

The to-be-predicted colour component of the current block is encoded according to the target prediction value.

It will be appreciated that the first memory 2002 in the embodiments of the present disclosure may be volatile memory or non-volatile memory and may also include both volatile and non-volatile memory. The non-volatile memory can be Read Only Memory (ROM), Programmable Read-Only Memory (PROM), Erasable Programmable Read-Only Memory (EPROM), Electrically Erasable Programmable Read-Only Memory (EEPROM), or flash memory. The volatile memory may be a Random Access Memory (RAM) which serves as an external cache. By way of illustration but not limitation, many forms of the RAM are available, for example, Static Random Access Memory (RAM), Dynamic Random Access Memory (DRAM), Synchronous Dynamic Random Access Memory (SDRAM), Double Data Rate Synchronous Dynamic Random Access Memory (DDRS-DRAM), Enhanced Synchronous Dynamic Random Access Memory (ESDRAM), SyncLink Dynamic Random Access Memory (SLDRAM), and Direct Rambus Random Access Memory (DRRAM). The first memory 2002 of the systems and methods described in the embodiments of the present disclosure is intended to include but not limited to these and any other suitable types of memory.

The first processor 2003 may be an integrated circuit chip having signal processing capability. In implementation, the operations of the above method may be accomplished by integrated logic circuitry of hardware in processor 402 or by instructions in the form of software. The first processor 2003 described above may be a general purpose processor, a Digital Signal Processor (DSP), other programmable logic device, a discrete gate, transistor logic device, or a discrete hardware component or the like. The operations of the method disclosed in connection with the embodiment of the present disclosure can be directly embodied in the execution completion of the hardware decoding processor, or by the combination of the hardware and software modules in the decoding processor. The software module can be located in RAM, flash memory, ROM, PROM, EPROM or registers and other storage media mature in the art. The storage medium is located in the first memory 2002, and the first processor 2003 reads the information in the first memory 2002 and completes the steps of the above method in combination with its hardware.

It will be appreciated that the embodiments described herein may be implemented in hardware, software, firmware, middleware, microcode or a combination thereof. For the hardware implementation, the processing unit may be implemented in one or more Application Specific Integrated Circuits (ASIC), Digital Signal Processors (DSPD), Digital Signal Processing Devices (DSPD), Programmable Logic Devices (PLD), Field-Programmable Gate Arrays (FPGA), general purpose processors, controllers, microcontrollers, microprocessors, other electronic units or combinations thereof for performing the functions described herein. For software implementations, the technology described herein may be implemented by modules (e.g. procedures, functions, etc.) that perform the functions described herein. The software codes may be stored in memory and executed by a processor. The memory can be implemented in the processor or outside the processor.

Alternatively, as another embodiment the first processor 2003 is further configured to perform the method described in any of the preceding embodiments when the computer programs is run.

The embodiments provide an encoder including a first determining unit, a first predicting unit, and a coding unit. In this way, for the encoder, the correlation between colour components can be used for prediction enhancement on the initial prediction value according to the side information of the current block and the preset network model, so that the enhanced target prediction value is closer to the true value, thereby effectively improving the prediction accuracy, improving the encoding and decoding efficiency and improving the overall encoding and decoding performance.

Figure 21:
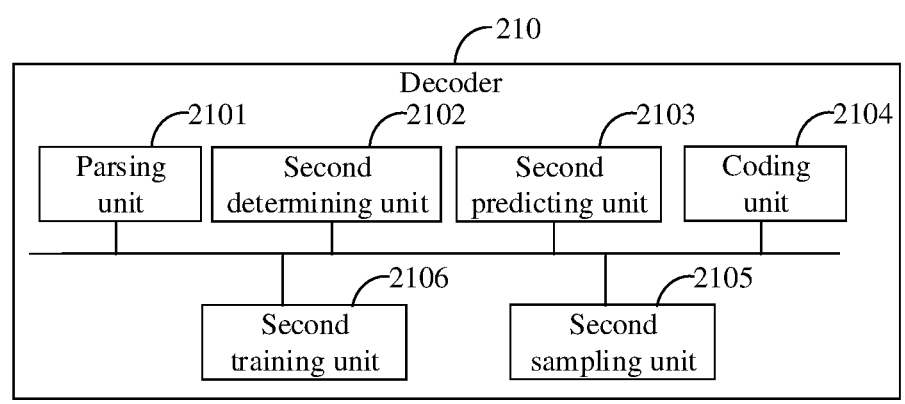
FIG. 21 is a schematic structural diagram of a decoder according to an embodiment of the present disclosure.

Based on the same inventive concept of the foregoing embodiments, with reference to FIG. 21, a schematic structural diagram of a decoder 210 according to an embodiment of the present disclosure is shown. As shown in FIG. 21, the decoder 210 may include a parsing unit 2101, a second determining unit 2102, a second predicting unit 2103 and a coding unit 2104.

The parsing unit 2101 is configured to parse a bitstream to determine a target prediction mode of a current block.

The second determining unit 2102 is configured to determine an initial prediction value of a to-be-predicted colour component of a current block according to the target prediction mode.

The second determining unit 2102 is further configured to determine a sample associated with a reference colour component of the current block, and determine side information of the current block according to the sample associated with the reference colour component.

The second predicting unit 2103 is configured to filter the initial prediction value by using a preset network model and the side information of the current block, to obtain a target prediction value of the to-be-predicted colour component of the current block.

The coding unit 2104 is configured to decode the to-be-predicted colour component of the current block according to the target prediction value.

In some embodiments, the second predicting unit 2103 is further configured to predict the to-be-predicted colour component of the current block according to the target prediction mode, to obtain the initial prediction value of the to-be-predicted colour component of the current block.

In some embodiments, the target prediction mode is an intra prediction mode or an inter prediction mode.

In some embodiments, the target prediction mode is a prediction mode within a same colour component or a prediction mode between different colour components.

In some embodiments, the reference colour component includes one or more colour components in a current picture that are different from the to-be-predicted colour component, and the current picture is a picture where the current block is located.

In some embodiments a second determining unit 2102 is specifically configured to determine the sample associated with the reference colour component according to at least one of: a prediction value of the reference colour component of the current block, or a reconstructed value of the reference colour component of the current block.

In some embodiments, a second determining unit 2102 is specifically configured to determine the sample associated with the reference colour component according to at least one of: a prediction value of the reference colour component corresponding to a pixel adjacent to the current block, or a reconstructed value of the reference colour component corresponding to the pixel adjacent to the current block.

In some embodiments, the pixel adjacent to the current block includes at least one row of pixels adjacent to the current block.

In some embodiments, the pixel adjacent to the current block includes at least one column of pixels adjacent to the current block.

In some embodiments, the reference colour component includes one or more colour components in a reference picture, where the reference picture is different from a current picture where the current block is located.

In some embodiments, a second determining unit 2102 is specifically configured to determine the sample associated with the reference colour component according to reconstructed values of one or more colour components in a prediction reference block of the current block.

In some embodiments, the parsing unit 2101 is further configured to parse the bitstream to acquire an inter prediction mode parameter of the current block in response to the target prediction mode being the inter prediction mode, where the inter prediction mode parameter includes a reference picture index and a motion vector.

The second determining unit 2102 is further configured to determine the reference picture according to the reference picture index determine the prediction reference block in the reference picture according to the motion vector.

In some embodiments, the second determining unit 2102 is further configured to determine the sample associated with the reference colour component as the side information of the current block.

In some embodiments, with reference to FIG. 21, the decoder 210 may further include a second sampling unit 2105 configured to perform a first filtering processing on the sample associated with the reference colour component according to a colour component sampling format, to obtain a filtered sample associated with the reference colour component, and determine the filtered sample associated with the reference colour component as the side information of the current block.

In some embodiments, the parsing unit 2101 is further configured to parse the bitstream to acquire the colour component sampling format.

In some embodiments, the parsing unit 2101 is further configured to parse a data unit of a parameter set in the bitstream to acquire a value of a bit field for indicating the colour component sampling format.

The second determining unit 2102 is further configured to determine the the colour component sampling format according to the value of the bit field.

In some embodiments, the second sampling unit 2105 is specifically configured to down-sample the sample associated with the reference colour component in response to a resolution of the initial prediction value being smaller than a resolution of the sample associated with the reference colour component; up-sample the sample associated with the reference colour component in response to the resolution of the initial prediction value being greater than the resolution of the sample associated with the reference colour component; and the filtered sample associated with the reference colour component is set to be equal to the sample associated with the reference colour component in response to the resolution of the initial prediction value being equal to the resolution of the sample associated with the reference colour component.

In some embodiments, a resolution of the filtered sample associated with the reference colour component is equal to a resolution of the initial prediction value.

In some embodiments, the sample associated with the reference colour component of the current block includes at least two of: the reconstructed value of the reference colour component of the current block, a reference colour component value corresponding to at least one row of pixels adjacent to the current block, or a reference colour component value corresponding to at least one column of pixels adjacent to the current block, where the reference colour component of the current block is different from the to-be-predicted colour component.

In some embodiments, the second predicting unit 2103 is specifically configured to input the side information of the current block and the initial prediction value of the to-be-predicted colour component into the preset network model to output the target prediction value of the to-be-predicted colour component by the preset network model.

In some embodiments, a second determining unit 2102 is further configured to determine the preset network model.

In some embodiments, the preset network model includes a neural network model and a first adder.

In some embodiments, a second predicting unit 2103 is specifically configured to input the side information and the initial prediction value into the neural network model to output an intermediate value; and perform addition processing on the intermediate value and the initial prediction value by the first adder to obtain the target prediction value.

In some embodiments, the neural network model includes at least one of: a convolution layer, a residual layer, an average pooling layer, or a sampling conversion module.

In some embodiments, the residual layer includes at least one of: an activation function, a convolution layer, or a second adder.

In some embodiments, with reference to FIG. 21, the decoder 210 may further include a second training unit 2106 configured to acquire a training sample set, where the training sample set includes one or more pictures; construct an initial network model, and train the initial network model by using the training sample set; and determine a trained initial network model as the preset network model.

In some embodiments, the parsing unit 2101 is further configured to parse the bitstream to acquire network model parameters of the preset network model.

The second determining unit 2102 is further configured to determine the preset network model according to determined network model parameters.

It will be understood that in the embodiments of the present disclosure, a "unit" may be a part of a circuit, a part of a processor, a part of programs or software, etc., of course it may also be a module, or it may be non-modular. Moreover, each component in the embodiments of the present disclosure may be integrated in one processing unit, each unit may exist physically alone, or two or more units may be integrated in one unit. The integrated unit can be implemented either in the form of hardware or in the form of software function module.

If the integrated unit is implemented in the form of software functional modules and sold or used as an independent product, it can be stored in a computer readable storage medium. Based on such understanding, the present embodiments provide a computer storage medium, applied to the decoder 210, having stored thereon picture prediction programs that, when executed by a second processor, cause the second processor to perform the method described in any of the preceding embodiments.

Figure 22:
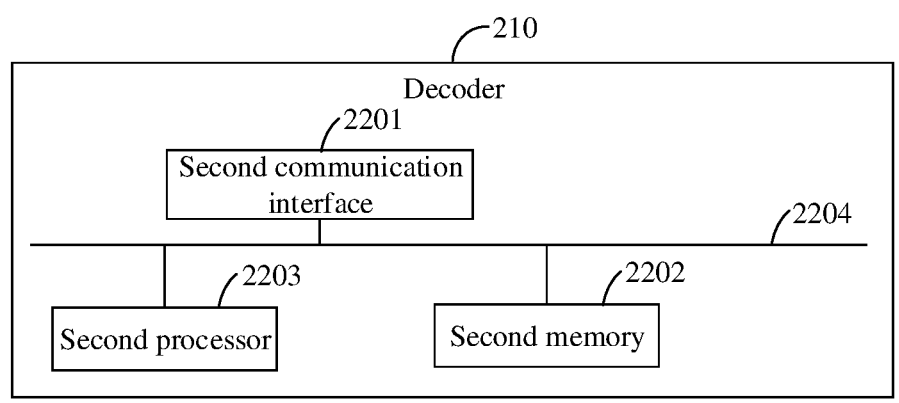
FIG. 22 is a schematic diagram of a specific hardware structure of a decoder according to an embodiment of the disclosure.

Based on the composition of the decoder 210 and the computer storage described above, with reference to FIG. 22, a schematic diagram of a specific hardware structure of a decoder according to an embodiment of the disclosure is shown. As shown in FIG. 22, the decoder 210 may include a second communication interface 2201, a second memory 2202 and a second processor 2203. The components are coupled together by a second bus system 2204. It can be appreciated that the second bus system 2204 is configured to implement connection communication between these components. The second bus system 2204 includes a power bus, a control bus and a status signal bus in addition to a data bus. However, for the sake of clarity, the various buses are designated in FIG. 22 as the second bus system 2204.

The second communication interface 2201 is configured to receive and send signals in the process of sending and receiving information with other external network elements.

The second memory 2202 is configured to store computer programs capable of running on the second processor 2203.

The second processor 2203 is configured to run the computer programs to perform the following six operations.

A bitstream is parsed to acquire a target prediction mode of a current block.

An initial prediction value of a to-be-predicted colour component of a current block is determined according to the target prediction mode.

A sample associated with a reference colour component of the current block is determined.

Side information of the current block is determined according to the sample associated with the reference colour component.

The initial prediction value is filtered by using a preset network model and the side information of the current block, to obtain a target prediction value of the to-be-predicted colour component of the current block.

The to-be-predicted colour component of the current block is decoded according to the target prediction value.

Alternatively, as another embodiment, the second processor 2203 is further configured to perform the method described in any of the preceding embodiments when the computer program is run.

It will be appreciated that the second memory 2202 is similar to the first memory 2002 in hardware function and the second processor 2203 is similar to the first processor 2003 in hardware function, which will not go into details herein.

The embodiments of the present disclosure provide a decoder including the parsing unit, the second determining unit, the second predicting unit and the coding unit. In this way, for the decoder, the correlation between colour components can be used for prediction enhancement on the initial prediction value according to the side information of the current block and the preset network model, so that the enhanced target prediction value is closer to the true value, thereby effectively improving the prediction accuracy, improving the encoding and decoding efficiency and improving the overall encoding and decoding performance.

Embodiment 1. A picture prediction method, applied to an encoder, the method comprising:
- determining an initial prediction value of a to-be-predicted colour component of a current block;
- determining a sample associated with a reference colour component of the current block;
- determining side information of the current block according to the sample associated with the reference colour component;
- filtering the initial prediction value by using a preset network model and the side information of the current block, to obtain a target prediction value of the to-be-predicted colour component of the current block; and
- encoding the to-be-predicted colour component of the current block according to the target prediction value.

Embodiment 2. The method of embodiment 1, wherein determining the initial prediction value of the to-be-predicted colour component of the current block comprises:
- determining a target prediction mode of the current block; and
- predicting the to-be-predicted colour component of the current block according to the target prediction mode, to determine the initial prediction value of the to-be-predicted colour component of the current block.

Embodiment 3. The method of embodiment 2, wherein determining the target prediction mode of the current block comprises:
- determining the to-be-predicted colour component of the current block;
- pre-coding the to-be-predicted colour component by using one or more candidate prediction modes respectively, and determining a rate-distortion cost result corresponding to each of the candidate prediction modes; and
- selecting an optimal rate-distortion cost result from the rate-distortion cost results, and determining a candidate prediction mode corresponding to the optimal rate-distortion cost result as the target prediction mode of the current block.

Embodiment 4. The method of embodiment 2 or 3, wherein the target prediction mode is an intra prediction mode or an inter prediction mode.

Embodiment 5. The method of embodiment 4, wherein the target prediction mode is a prediction mode within a same colour component or a prediction mode between different colour components.

Embodiment 6. The method of embodiment 1, wherein the reference colour component comprises one or more colour components in a current picture that are different from the to-be-predicted colour component, the current picture being a picture where the current block is located.

Embodiment 7. The method of embodiment 6, wherein determining the sample associated with the reference colour component of the current block comprises:
determining the sample associated with the reference colour component according to at least one of: a prediction value of the reference colour component of the current block, or a reconstructed value of the reference colour component of the current block.

Embodiment 8. The method of embodiment 6, wherein determining the sample associated with the reference colour component of the current block comprises:
determining the sample associated with the reference colour component according to at least one of: a prediction value of the reference colour component corresponding to a pixel adjacent to the current block, or a reconstructed value of the reference colour component corresponding to the pixel adjacent to the current block.

Embodiment 9. The method of embodiment 8, wherein the pixel adjacent to the current block comprises at least one row of pixels adjacent to the current block.

Embodiment 10. The method of embodiment 8, wherein the pixel adjacent to the current block comprises at least one column of pixels adjacent to the current block.

Embodiment 11. The method of embodiment 4, wherein the reference colour component comprises one or more colour components in a reference picture, wherein the reference picture is different from a current picture where the current block is located.

Embodiment 12. The method of embodiment 11, wherein determining the sample associated with the reference colour component of the current block comprises:
determining the sample associated with the reference colour component according to reconstructed values of one or more colour components in a prediction reference block of the current block.

Embodiment 13. The method of embodiment 12, further comprising:
in response to the target prediction mode being the inter prediction mode, determining an inter prediction mode parameter of the current block, wherein the inter prediction mode parameter comprises a reference picture index indicating the reference picture and a motion vector indicating the prediction reference block in the reference picture; and
signalling a determined inter prediction mode parameter.

Embodiment 14. The method of embodiment 1, wherein determining the side information of the current block according to the sample associated with the reference colour component comprises:
determining the sample associated with the reference colour component as the side information of the current block.

Embodiment 15. The method of embodiment 1, wherein determining the side information of the current block according to the sample associated with the reference colour component comprises:
performing a first filtering processing on the sample associated with the reference colour component according to a colour component sampling format, to obtain a filtered sample associated with the reference colour component; and
determining the filtered sample associated with the reference colour component as the side information of the current block.

Embodiment 16. The method of embodiment 15, further comprising:
signalling the colour component sampling format.

Embodiment 17. The method of embodiment 16, further comprising:
determining a value of a bit field to be signalled, wherein the value of the bit field is used for indicating the colour component sampling format; and
signalling the value of the bit field.

Embodiment 18. The method of embodiment 15, wherein performing the first filtering processing on the sample associated with the reference colour component comprises:
in response to a resolution of the initial prediction value being smaller than a resolution of the sample associated with the reference colour component, down-sampling the sample associated with the reference colour component;
in response to the resolution of the initial prediction value being greater than the resolution of the sample associated with the reference colour component, up-sampling the sample associated with the reference colour component; and
in response to the resolution of the initial prediction value being equal to the resolution of the sample associated with the reference colour component, setting the filtered sample associated with the reference colour component to be equal to the sample associated with the reference colour component.

Embodiment 19. The method of embodiment 15, wherein a resolution of the filtered sample associated with the reference colour component is equal to a resolution of the initial prediction value.

Embodiment 20. The method of embodiment 1, wherein:
the sample associated with the reference colour component of the current block comprises at least two of: the reconstructed value of the reference colour component of the current block, a reference colour component value corresponding to at least one row of pixels adjacent to the current block, or a reference colour component value corresponding to at least one column of pixels adjacent to the current block, wherein the reference colour component of the current block is different from the to-be-predicted colour component.

Embodiment 21. The method of embodiment 1, wherein filtering the initial prediction value by using the preset network model and the side information of the current block, to obtain the target prediction value of the to-be-predicted colour component of the current block comprises:
inputting the side information of the current block and the initial prediction value of the to-be-predicted colour component into the preset network model to output the target prediction value of the to-be-predicted colour component by the preset network model.

Embodiment 22. The method of embodiment 21, further comprising:
determining the preset network model.

Embodiment 23. The method of embodiment 22, wherein the preset network model comprises a neural network model and a first adder.

Embodiment 24. The method of embodiment 23, wherein inputting the side information of the current block and the initial prediction value of the to-be-predicted colour component into the preset network model to output the target prediction value of the to-be-predicted colour component by the preset network model comprises:
  inputting the side information and the initial prediction value into the neural network model to output an intermediate value; and
  performing addition processing on the intermediate value and the initial prediction value by the first adder to obtain the target prediction value.

Embodiment 25. The method of embodiment 23, wherein the neural network model comprises at least one of: a convolution layer, a residual layer, an average pooling layer, or a sampling rate conversion module.

Embodiment 26. The method of embodiment 25, wherein the residual layer comprises at least one of: an activation function, a convolution layer, or a second adder.

Embodiment 27. The method of embodiment 22, wherein determining the preset network model comprises:
  acquiring a training sample set, wherein the training sample set comprises one or more pictures;
  constructing an initial network model, and training the initial network model by using the training sample set; and
  determining a trained initial network model as the preset network model.

Embodiment 28. The method of embodiment 22, wherein determining the preset network model comprises:
  determining network model parameters; and
  constructing the preset network model according to determined network model parameters.

Embodiment 29. A picture prediction method, applied to a decoder, the method comprising:
  parsing a bitstream to acquire a target prediction mode of a current block;
  determining an initial prediction value of a to-be-predicted colour component of the current block according to the target prediction mode;
  determining a sample associated with a reference colour component of the current block;
  determining side information of the current block according to the sample associated with the reference colour component;
  filtering the initial prediction value by using a preset network model and the side information of the current block, to obtain a target prediction value of the to-be-predicted colour component of the current block; and
  decoding the to-be-predicted colour component of the current block according to the target prediction value.

Embodiment 30. The method of embodiment 29, wherein determining the initial prediction value of the to-be-predicted colour component of the current block according to the target prediction mode comprises:
  predicting the to-be-predicted colour component of the current block according to the target prediction mode, to obtain the initial prediction value of the to-be-predicted colour component of the current block.

Embodiment 31. The method of embodiment 30, wherein the target prediction mode is an intra prediction mode or an inter prediction mode.

Embodiment 32. The method of embodiment 31, wherein the target prediction mode is a prediction mode within a same colour component or a prediction mode between different colour components.

Embodiment 33. The method of embodiment 29, wherein the reference colour component comprises one or more colour components in a current picture that are different from the to-be-predicted colour component, the current picture being a picture where the current block is located.

Embodiment 34. The method of embodiment 33, wherein determining the sample associated with the reference colour component of the current block comprises:
  determining the sample associated with the reference colour component according to at least one of: a prediction value of the reference colour component of the current block, or a reconstructed value of the reference colour component of the current block.

Embodiment 35. The method of embodiment 33, wherein determining the sample associated with the reference colour component of the current block comprises:
  determining the sample associated with the reference colour component according to at least one of: a prediction value of the reference colour component corresponding to a pixel adjacent to the current block, or a reconstructed value of the reference colour component corresponding to the pixel adjacent to the current block.

Embodiment 36. The method of embodiment 35, wherein the pixel adjacent to the current block comprises at least one row of pixels adjacent to the current block.

Embodiment 37. The method of embodiment 35, wherein the pixel adjacent to the current block comprises at least one column of pixels adjacent to the current block.

Embodiment 38. The method of embodiment 29, wherein the reference colour component comprises one or more colour components in a reference picture, wherein the reference picture is different from a current picture where the current block is located.

Embodiment 39. The method of embodiment 38, wherein determining the sample associated with the reference colour component of the current block comprises:
  determining the sample associated with the reference colour component according to reconstructed values of one or more colour components in a prediction reference block of the current block.

Embodiment 40. The method of embodiment 39, further comprising:
  in response to the target prediction mode being the inter prediction mode, parsing the bitstream to acquire an inter prediction mode parameter of the current block, wherein the inter prediction mode parameter comprises a reference picture index and a motion vector;
  determining the reference picture according to the reference picture index; and
  determining the prediction reference block in the reference picture according to the motion vector.

Embodiment 41. The method of embodiment 29, wherein determining the side information of the current block according to the sample associated with the reference colour component comprises:
  determining the sample associated with the reference colour component as the side information of the current block.

Embodiment 42. The method of embodiment 29, wherein determining the side information of the current block according to the sample associated with the reference colour component comprises:
  performing a first filtering processing on the sample associated with the reference colour component according to a colour component sampling format, to obtain a filtered sample associated with the reference colour component; and
  determining the filtered sample associated with the reference colour component as the side information of the current block.

Embodiment 43. The method of embodiment 42, further comprising:
parsing the bitstream to acquire the colour component sampling format.

Embodiment 44. The method of embodiment 43, further comprising:
parsing a data unit of a parameter set in the bitstream to acquire a value of a bit field for indicating the colour component sampling format; and
determining the colour component sampling format according to the value of the bit field.

Embodiment 45. The method of embodiment 42, wherein performing the first filtering processing on the sample associated with the reference colour component comprises:
in response to a resolution of the initial prediction value being smaller than a resolution of the sample associated with the reference colour component, down-sampling the sample associated with the reference colour component;
in response to the resolution of the initial prediction value being greater than the resolution of the sample associated with the reference colour component, up-sampling the sample associated with the reference colour component; and
in response to the resolution of the initial prediction value being equal to the resolution of the sample associated with the reference colour component, setting the filtered sample associated with the reference colour component to be equal to the sample associated with the reference colour component.

Embodiment 46. The method of embodiment 42, wherein a resolution of the filtered sample associated with the reference colour component is equal to a resolution of the initial prediction value.

Embodiment 47. The method of embodiment 29, wherein determining the sample associated with the reference colour component of the current block comprises:
the sample associated with the reference colour component of the current block comprises at least two of: the reconstructed value of the reference colour component of the current block, a reference colour component value corresponding to at least one row of pixels adjacent to the current block, or a reference colour component value corresponding to at least one column of pixels adjacent to the current block, wherein the reference colour component of the current block is different from the to-be-predicted colour component.

Embodiment 48. The method of embodiment 29, wherein filtering the initial prediction value by using the preset network model and the side information of the current block, to obtain the target prediction value of the to-be-predicted colour component of the current block comprises:
inputting the side information of the current block and the initial prediction value of the to-be-predicted colour component into the preset network model to output the target prediction value of the to-be-predicted colour component by the preset network model.

Embodiment 49. The method of embodiment 48, further comprising:
determining the preset network model.

Embodiment 50. The method of embodiment 49, wherein the preset network model comprises a neural network model and a first adder.

Embodiment 51. The method of embodiment 50, wherein inputting the side information of the current block and the initial prediction value of the to-be-predicted colour component into the preset network model to output the target prediction value of the to-be-predicted colour component by the preset network model comprises:
inputting the side information and the initial prediction value into the neural network model to output an intermediate value; and
performing addition processing on the intermediate value and the initial prediction value by the first adder to obtain the target prediction value.

Embodiment 52. The method of embodiment 50, wherein the neural network model comprises at least one of: a convolution layer, a residual layer, an average pooling layer, or a sampling rate conversion module.

Embodiment 53. The method of embodiment 52, wherein the residual layer comprises at least one of: an activation function, a convolution layer, or a second adder.

Embodiment 54. The method of embodiment 49, wherein determining the preset network model comprises:
acquiring a training sample set, wherein the training sample set comprises one or more pictures;
constructing an initial network model, and training the initial network model by using the training sample set; and
determining a trained initial network model as the preset network model.

Embodiment 55. The method of embodiment 54, wherein determining the preset network model comprises:
parsing the bitstream to acquire network model parameters of the preset network model; and
determining the preset network model according to determined network model parameters.

Embodiment 56. An encoder, comprising a first determining unit, a first predicting unit and a coding unit,
wherein the first determining unit is configured to determine an initial prediction value of a to-be-predicted colour component of a current block;
the first determining unit is further configured to determine a sample associated with a reference colour component of the current block, and determine side information of the current block according to the sample associated with the reference colour component;
the first predicting unit is configured to filter the initial prediction value by using a preset network model and the side information of the current block, to obtain a target prediction value of the to-be-predicted colour component of the current block; and
the coding unit is configured to encode the to-be-predicted colour component of the current block according to the target prediction value.

Embodiment 57. An encoder, comprising a first memory and a first processor,
wherein the first memory is configured to store computer programs capable of running on the first processor; and
the first processor is configured to perform the method according to any one of embodiments 1 to 28 when running the computer programs.

Embodiment 58. A decoder, comprising a parsing unit, a second determining unit, a second predicting unit and a coding unit,
wherein the parsing unit is configured to parse a bitstream to determine a target prediction mode of a current block;
the second determining unit is configured to determine an initial prediction value of a to-be-predicted colour component of a current block according to the target prediction mode;

the second determining unit is further configured to determine a sample associated with a reference colour component of the current block, and determine side information of the current block according to the sample associated with the reference colour component;

the second predicting unit is configured to filter the initial prediction value by using a preset network model and the side information of the current block, to obtain a target prediction value of the to-be-predicted colour component of the current block; and the coding unit is configured to decode the to-be-predicted colour component of the current block according to the target prediction value.

Embodiment 59. A decoder, comprising a second memory and a second processor, wherein the second memory is configured to store computer programs capable of running on the second processor; and the second processor is configured to perform the method according to any one of embodiments 29 to 55 when running the computer programs.

Embodiment 60. A computer storage medium having stored thereon picture prediction programs that, when executed by a first processor, cause the first processor to perform the method according to any one of embodiments 1 to 28, or when executed by a second processor, cause the second processor to perform the method according to any one of embodiments 29 to 55.

It is to be noted that, in this disclosure, the terms "includes", "including" or any other variation thereof, are intended to cover a non-exclusive inclusion, such that a process, method, article, or device that includes a list of elements includes not only those elements but also other elements not expressly listed, or also includes elements inherent to such process, method, article, or device. Without more limitations, an element is defined by the statement "including a . . . " that does not rule out there are additional identical elements in a process, method, article, or apparatus that includes the element.

The above-described embodiments of the present disclosure are for the purpose of description only and do not represent the advantages or disadvantages of the embodiments.

The methods disclosed in several method embodiments provided in the present disclosure can be arbitrarily combined without conflict to obtain new method embodiments.

The features disclosed in several product embodiments provided in the present disclosure can be arbitrarily combined without conflict to obtain new product embodiments.

The features disclosed in several methods or device embodiments provided in the present disclosure can be arbitrarily combined without conflict to obtain new method embodiments or device embodiments.

The above is only the specific embodiments of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

INDUSTRIAL PRACTICALITY

In the embodiments of the present disclosure, after an initial prediction value of a to-be-predicted colour component of a current block is determined; a sample associated with a reference colour component of the current block is determined; side information of the current block is determined according to the sample associated with the reference colour component; the initial prediction value is filtered by using a preset network model and the side information of the current block, to obtain a target prediction value of the to-be-predicted colour component of the current block; and The to-be-predicted colour component of the current block is encoded according to the target prediction value. In this way, the correlation between colour components can be used for prediction enhancement on the initial prediction value according to the side information of the current block and the preset network model, so that the enhanced target prediction value is closer to the true value, thereby effectively improving the prediction accuracy, improving the encoding and decoding efficiency and improving the overall encoding and decoding performance.

The invention claimed is:

1. A picture prediction method, applied to an encoder, the method comprising:
   determining an initial prediction value of a to-be-predicted colour component of a current block;
   determining a sample associated with a reference colour component of the current block;
   determining side information of the current block according to the sample associated with the reference colour component;
   filtering the initial prediction value by using a preset network model and the side information of the current block, to obtain a target prediction value of the to-be-predicted colour component of the current block; and
   encoding the to-be-predicted colour component of the current block according to the target prediction value.

2. The method of claim 1, wherein the reference colour component comprises one or more colour components in a current picture that are different from the to-be-predicted colour component, the current picture being a picture where the current block is located.

3. The method of claim 1, wherein determining the side information of the current block according to the sample associated with the reference colour component comprises:
   determining the sample associated with the reference colour component as the side information of the current block.

4. The method of claim 1, wherein determining the side information of the current block according to the sample associated with the reference colour component comprises:
   performing a first filtering processing on the sample associated with the reference colour component according to a colour component sampling format, to obtain a filtered sample associated with the reference colour component; and
   determining the filtered sample associated with the reference colour component as the side information of the current block.

5. The method of claim 4, further comprising:
   signalling the colour component sampling format;
   determining a value of a bit field to be signalled, wherein the value of the bit field is used for indicating the colour component sampling format; and
   signalling the value of the bit field.

6. The method of claim 1, wherein filtering the initial prediction value by using the preset network model and the side information of the current block, to obtain the target prediction value of the to-be-predicted colour component of the current block comprises:

inputting the side information of the current block and the initial prediction value of the to-be-predicted colour component into the preset network model to output the target prediction value of the to-be-predicted colour component by the preset network model.

7. The method of claim 6, further comprising:
determining the preset network model,
wherein determining the preset network model comprises:
determining network model parameters; and
constructing the preset network model according to determined network model parameters.

8. The method of claim 7, wherein the preset network model comprises a neural network model and a first adder,
wherein the neural network model comprises at least one of: a convolution layer, a residual layer, an average pooling layer, or a sampling conversion module, and
wherein the residual layer comprises at least one of: an activation function, a convolution layer, or a second adder.

9. The method of claim 8, wherein inputting the side information of the current block and the initial prediction value of the to-be-predicted colour component into the preset network model to output the target prediction value of the to-be-predicted colour component by the preset network model comprises:
inputting the side information and the initial prediction value into the neural network model to output an intermediate value; and
performing addition processing on the intermediate value and the initial prediction value by the first adder to obtain the target prediction value.

10. The method of claim 7, wherein determining the preset network model comprises:
acquiring a training sample set, wherein the training sample set comprises one or more pictures;
constructing an initial network model, and training the initial network model by using the training sample set; and
determining a trained initial network model as the preset network model.

11. A picture prediction method, applied to a decoder, the method comprising:
parsing a bitstream to acquire a target prediction mode of a current block;
determining an initial prediction value of a to-be-predicted colour component of the current block according to the target prediction mode;
determining a sample associated with a reference colour component of the current block;
determining side information of the current block according to the sample associated with the reference colour component;
filtering the initial prediction value by using a preset network model and the side information of the current block, to obtain a target prediction value of the to-be-predicted colour component of the current block; and
decoding the to-be-predicted colour component of the current block according to the target prediction value.

12. The method of claim 11, wherein the reference colour component comprises one or more colour components in a current picture that are different from the to-be-predicted colour component, the current picture being a picture where the current block is located.

13. The method of claim 11, wherein determining the side information of the current block according to the sample associated with the reference colour component comprises:
determining the sample associated with the reference colour component as the side information of the current block.

14. The method of claim 11, wherein determining the side information of the current block according to the sample associated with the reference colour component comprises:
performing a first filtering processing on the sample associated with the reference colour component according to a colour component sampling format, to obtain a filtered sample associated with the reference colour component; and
determining the filtered sample associated with the reference colour component as the side information of the current block.

15. The method of claim 14, further comprising:
parsing the bitstream to acquire the colour component sampling format;
parsing a data unit of a parameter set in the bitstream to acquire a value of a bit field for indicating the colour component sampling format; and
determining the colour component sampling format according to the value of the bit field.

16. The method of claim 11, wherein filtering the initial prediction value by using the preset network model and the side information of the current block, to obtain the target prediction value of the to-be-predicted colour component of the current block comprises:
inputting the side information of the current block and the initial prediction value of the to-be-predicted colour component into the preset network model to output the target prediction value of the to-be-predicted colour component by the preset network model.

17. The method of claim 16, further comprising:
determining the preset network model,
wherein determining the preset network model comprises:
parsing the bitstream to acquire network model parameters of the preset network model; and
determining the preset network model according to determined network model parameters.

18. The method of claim 17, wherein the preset network model comprises a neural network model and a first adder,
wherein the neural network model comprises at least one of: a convolution layer, a residual layer, an average pooling layer, or a sampling conversion module, and
wherein the residual layer comprises at least one of: an activation function, a convolution layer, or a second adder.

19. The method of claim 18, wherein inputting the side information of the current block and the initial prediction value of the to-be-predicted colour component into the preset network model to output the target prediction value of the to-be-predicted colour component by the preset network model comprises:
inputting the side information and the initial prediction value into the neural network model to output an intermediate value; and
performing addition processing on the intermediate value and the initial prediction value by the first adder to obtain the target prediction value.

20. The method of claim 17, wherein determining the preset network model comprises:
acquiring a training sample set, wherein the training sample set comprises one or more pictures;
constructing an initial network model, and training the initial network model by using the training sample set; and determining a trained initial network model as the preset network model.

* * * * *